(12) United States Patent
Kawate et al.

(10) Patent No.: US 7,447,421 B2
(45) Date of Patent: Nov. 4, 2008

(54) REPRODUCTION APPARATUS

(75) Inventors: Fumitaka Kawate, Kanagawa (JP);
Makoto Yamada, Tokyo (JP);
Mitsuhiro Hirabayashi, Tokyo (JP);
Toshihiro Ishizaka, Kanagawa (JP)

(73) Assignee: Sony Corporation (JP)

( * ) Notice: Subject to any disclaimer, the term of this patent is extended or adjusted under 35 U.S.C. 154(b) by 606 days.

(21) Appl. No.: 10/491,252

(22) PCT Filed: Oct. 2, 2002

(86) PCT No.: PCT/JP02/10265

§ 371 (c)(1),
(2), (4) Date: Nov. 24, 2004

(87) PCT Pub. No.: WO03/032636

PCT Pub. Date: Apr. 17, 2003

(65) Prior Publication Data

US 2005/0078939 A1    Apr. 14, 2005

(30) Foreign Application Priority Data

Oct. 2, 2001 (JP) .............................. 2001-306822
Dec. 17, 2001 (JP) .............................. 2001-383413

(51) Int. Cl.
*H04N 5/00* (2006.01)
(52) U.S. Cl. .................... 386/125; 386/46; 386/52; 348/571
(58) Field of Classification Search .................. 386/52, 386/125

See application file for complete search history.

(56) References Cited

U.S. PATENT DOCUMENTS 6,414,972 B1 * 7/2002 Hagai et al. ................. 370/532
2002/0057705 A1   5/2002 Hagal et al.

FOREIGN PATENT DOCUMENTS

| JP | 10-234014 A1 | 9/1998 |
| JP | 2001/268493 | 9/2001 |
| JP | 2001-346139 A1 | 12/2001 |

* cited by examiner

*Primary Examiner*—Thai Tran
*Assistant Examiner*—Girumsew Wendmagegn
(74) *Attorney, Agent, or Firm*—Lerner, David, Littenberg, Krumholz & Mentlik, LLP

(57) ABSTRACT

A reproduction apparatus reproduces view data including several tracks within a range of reproduction processing capacity. A reproduction apparatus for reproducing data from a recording medium having several tracks each used for recording image data and one or more pieces of edit data includes an input unit for inputting the data from the recording medium, an analysis unit for identifying the recording track type of the input data, a storage unit for storing a priority-level assignment table associating the track types with priority levels for a decoding process, and for storing a predetermined threshold value serving as a border between the priority levels for data to be reproduced and the priority levels for data not to be reproduced, a plurality of decode units each used for decoding a different type of data, and a priority-level determination unit for determining whether the input data is to be decoded based on the track type identified by the analysis unit, the priority level assigned to the input data and the threshold value, and for outputting the input data to one of the decode units selected in accordance with the type of the input data when decoding the input data.

7 Claims, 18 Drawing Sheets

| TRACK TYPE | PRIORITY LEVEL | THRESHOLD VALUE |
|---|---|---|
| VIDEO-1 | 1 | 2 |
| AUDIO-1 | 1 | 3 |
| AUDIO-2 | 4 | |
| AUDIO-3 | 3 | |
| AUDIO-4 | 2 | |
| GRAPHICS-1 | 1 | 3 |
| GRAPHICS-2 | 4 | |
| GRAPHICS-3 | 2 | |
| TEXT-1 | 1 | 2 |
| TEXT-2 | 3 | |
| TEXT-3 | 5 | |
| TEXT-4 | 6 | |

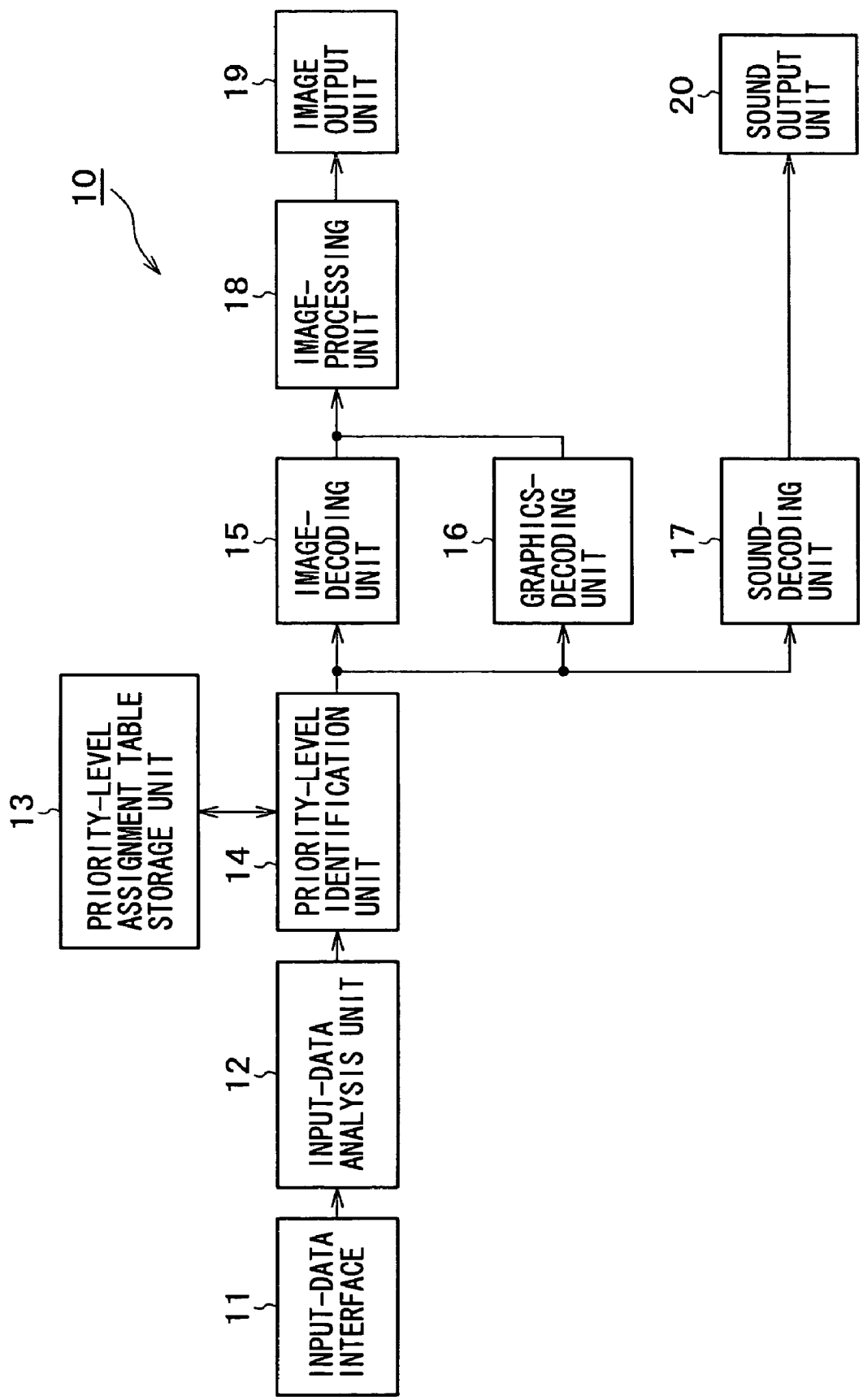

FIG. 2
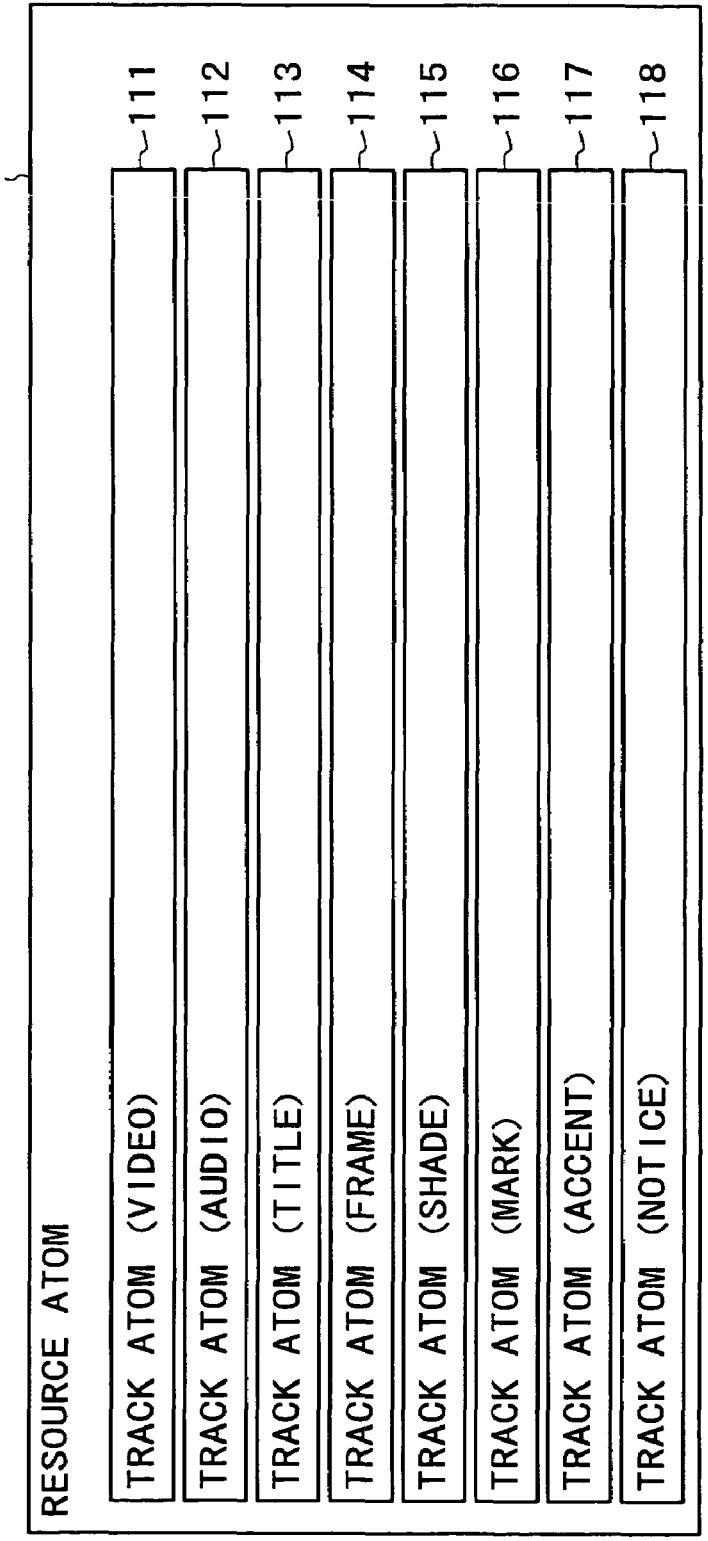
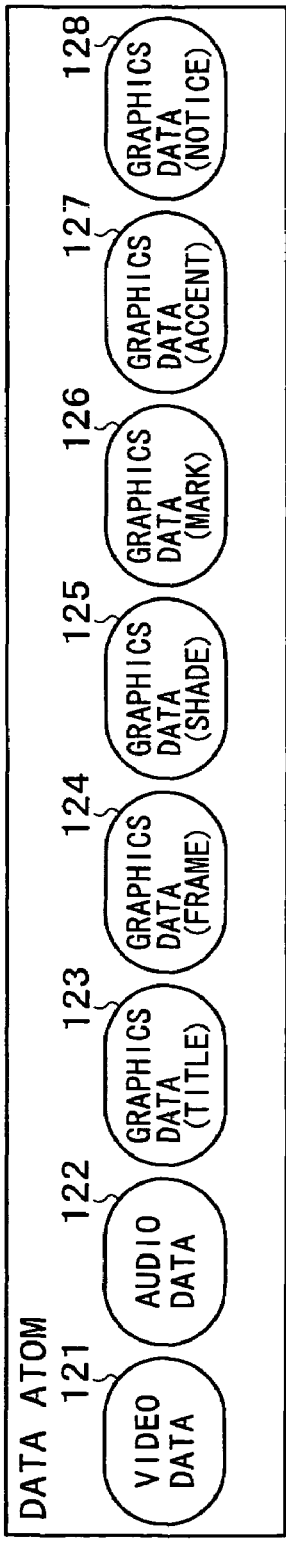

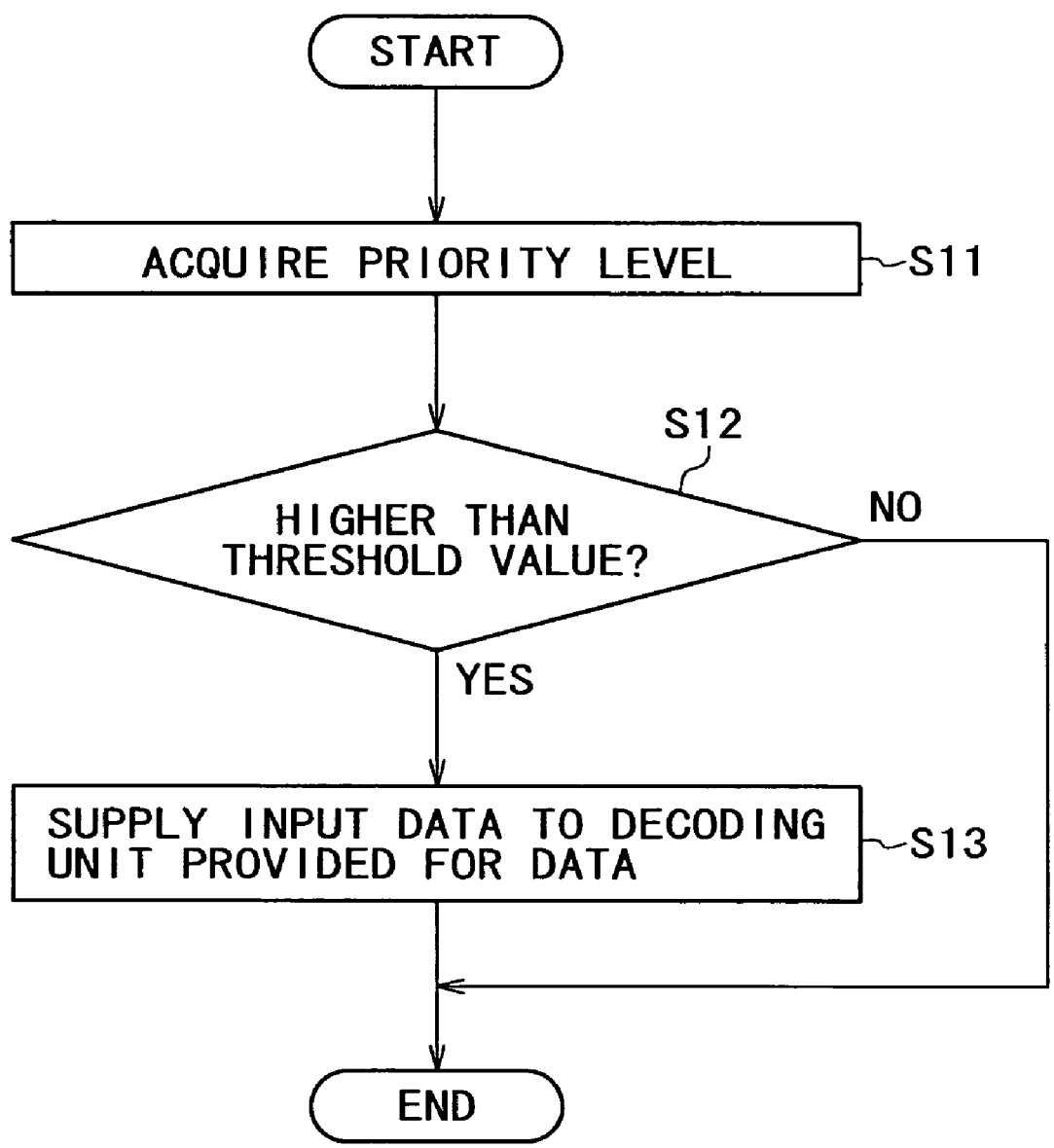

FIG. 4A

| TRACK TYPE | PRIORITY LEVEL |
|---|---|
| TITLE | 1 |
| FRAME | 5 |
| SHADE | 2 |
| MARK | 6 |
| ACCENT | 4 |
| NOTICE | 3 |

FIG. 4B

| EXISTENCE OF GRAPHIC TRACKS IN SIMULTANEOUS PROCESSING | | | | | | PRIORITY LEVELS | | | | | |
|---|---|---|---|---|---|---|---|---|---|---|---|
| TITLE | FRAME | SHADE | MARK | ACCENT | NOTICE | TITLE | FRAME | SHADE | MARK | ACCENT | NOTICE |
| NO | YES | YES | YES | YES | YES | 6 | 1 | 5 | 2 | 3 | 4 |
| YES | YES | YES | NO | NO | NO | 1 | 2 | 2 | 6 | 6 | 6 |
| ⋮ | | | | | | ⋮ | | | | | |
| NO | NO | NO | YES | YES | YES | 6 | 6 | 6 | 1 | 2 | 3 |

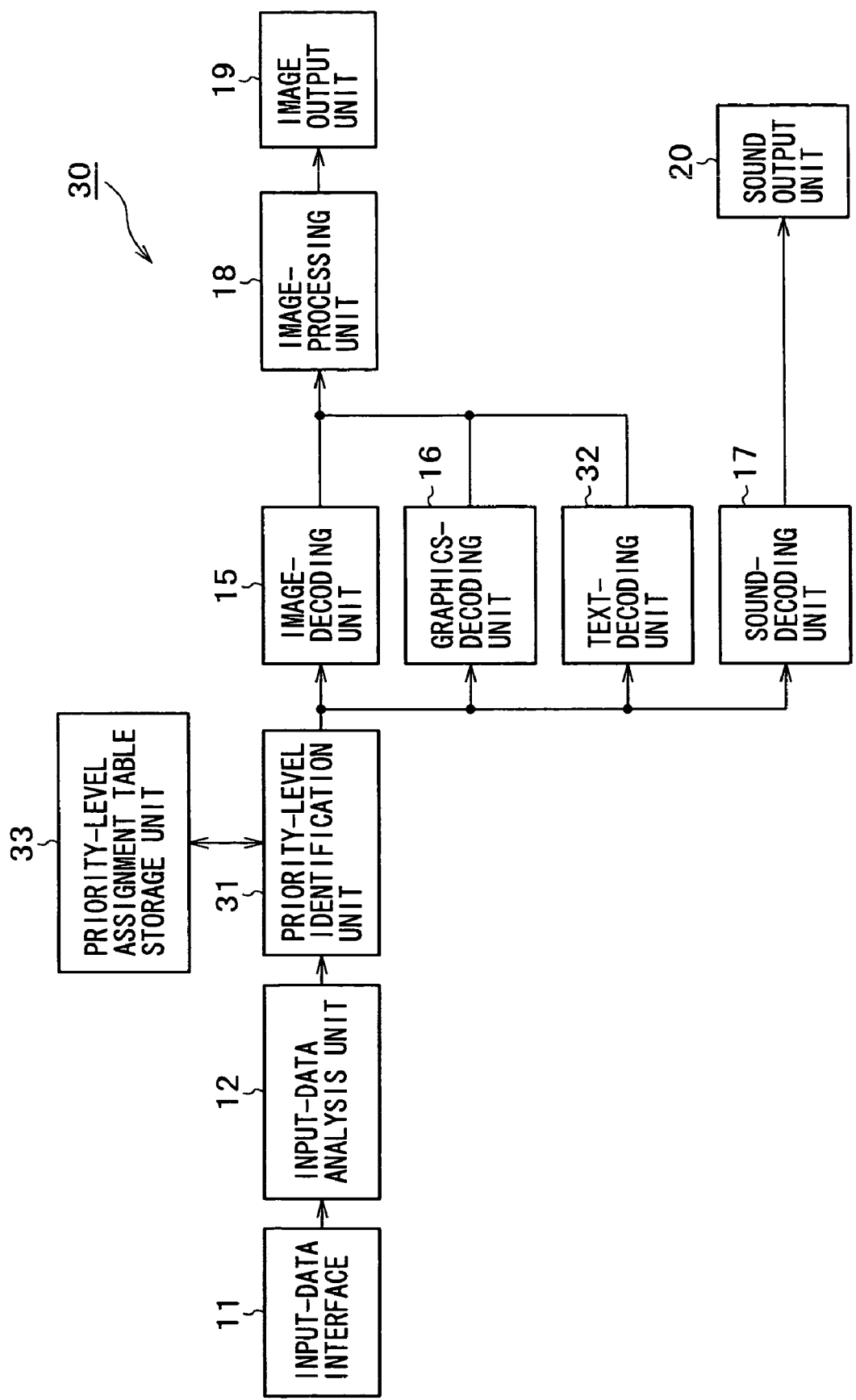

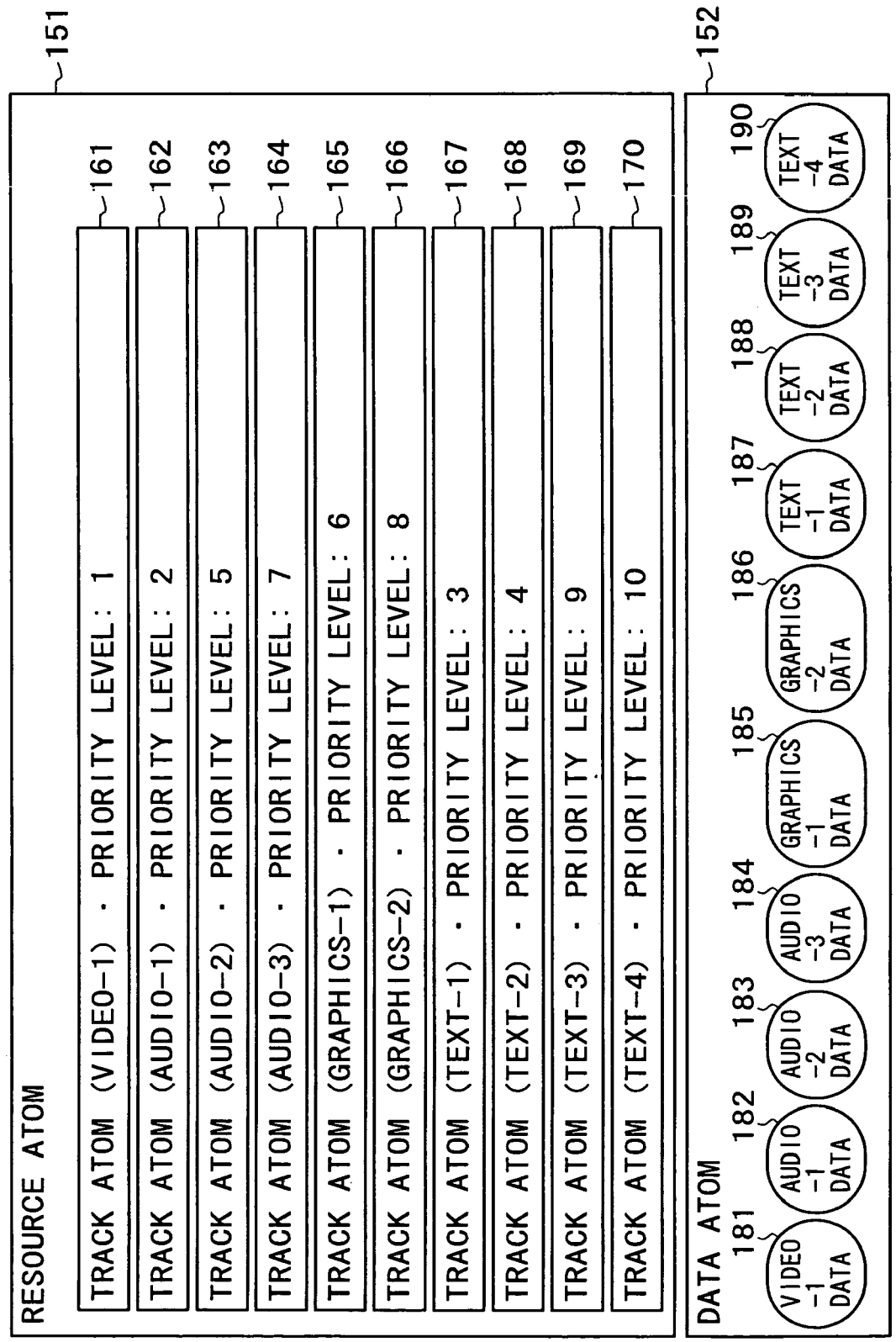

F I G. 7

| TRACK TYPE | PRIORITY LEVEL |
|---|---|
| VIDEO-1 | 1 |
| AUDIO-1 | 2 |
| AUDIO-2 | 5 |
| AUDIO-3 | 7 |
| GRAPHICS-1 | 6 |
| GRAPHICS-2 | 8 |
| TEXT-1 | 3 |
| TEXT-2 | 4 |
| TEXT-3 | 9 |
| TEXT-4 | 10 |

F I G. 9

| TRACK TYPE | PRIORITY LEVEL | THRESHOLD VALUE |
|---|---|---|
| VIDEO-1 | 1 | 2 |
| AUDIO-1 | 1 | 3 |
| AUDIO-2 | 4 | |
| AUDIO-3 | 3 | |
| AUDIO-4 | 2 | |
| GRAPHICS-1 | 1 | 3 |
| GRAPHICS-2 | 4 | |
| GRAPHICS-3 | 2 | |
| TEXT-1 | 1 | 2 |
| TEXT-2 | 3 | |
| TEXT-3 | 5 | |
| TEXT-4 | 6 | |

FIG. 12

| TRACK TYPE | PRIORITY LEVEL |
| --- | --- |
| VIDEO-1 | 1 |
| VIDEO-2 | 9 |
| AUDIO-1 | 6 |
| AUDIO-2 | 2 |
| AUDIO-3 | 11 |
| AUDIO-4 | 12 |
| GRAPHICS-1 | 4 |
| GRAPHICS-2 | 10 |
| GRAPHICS-3 | 5 |
| GRAPHICS-4 | 15 |
| GRAPHICS-5 | 17 |
| TEXT-1 | 3 |
| TEXT-2 | 7 |
| TEXT-3 | 8 |
| TEXT-4 | 13 |
| TEXT-5 | 14 |
| TEXT-6 | 16 |

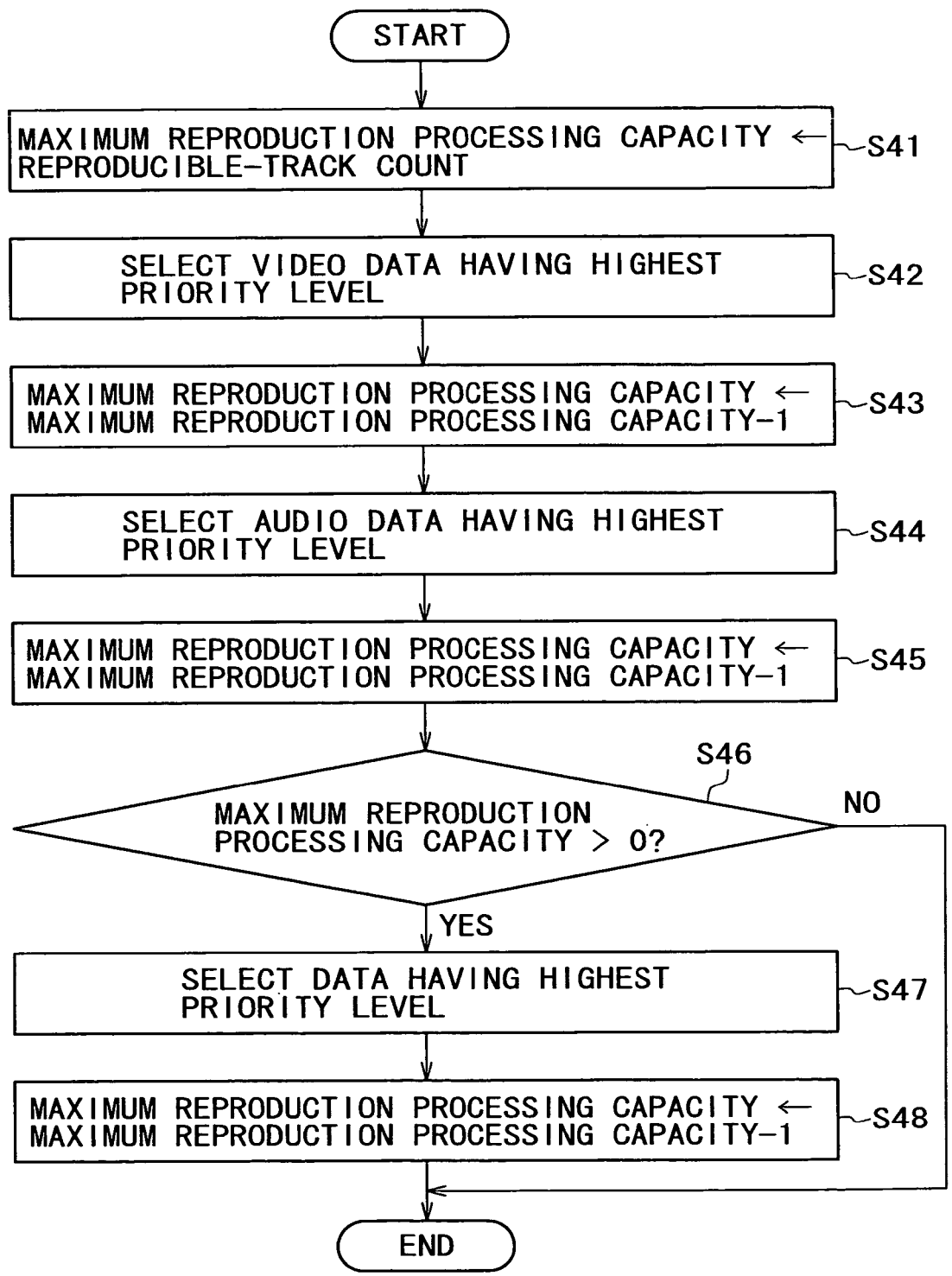

F I G. 1 4
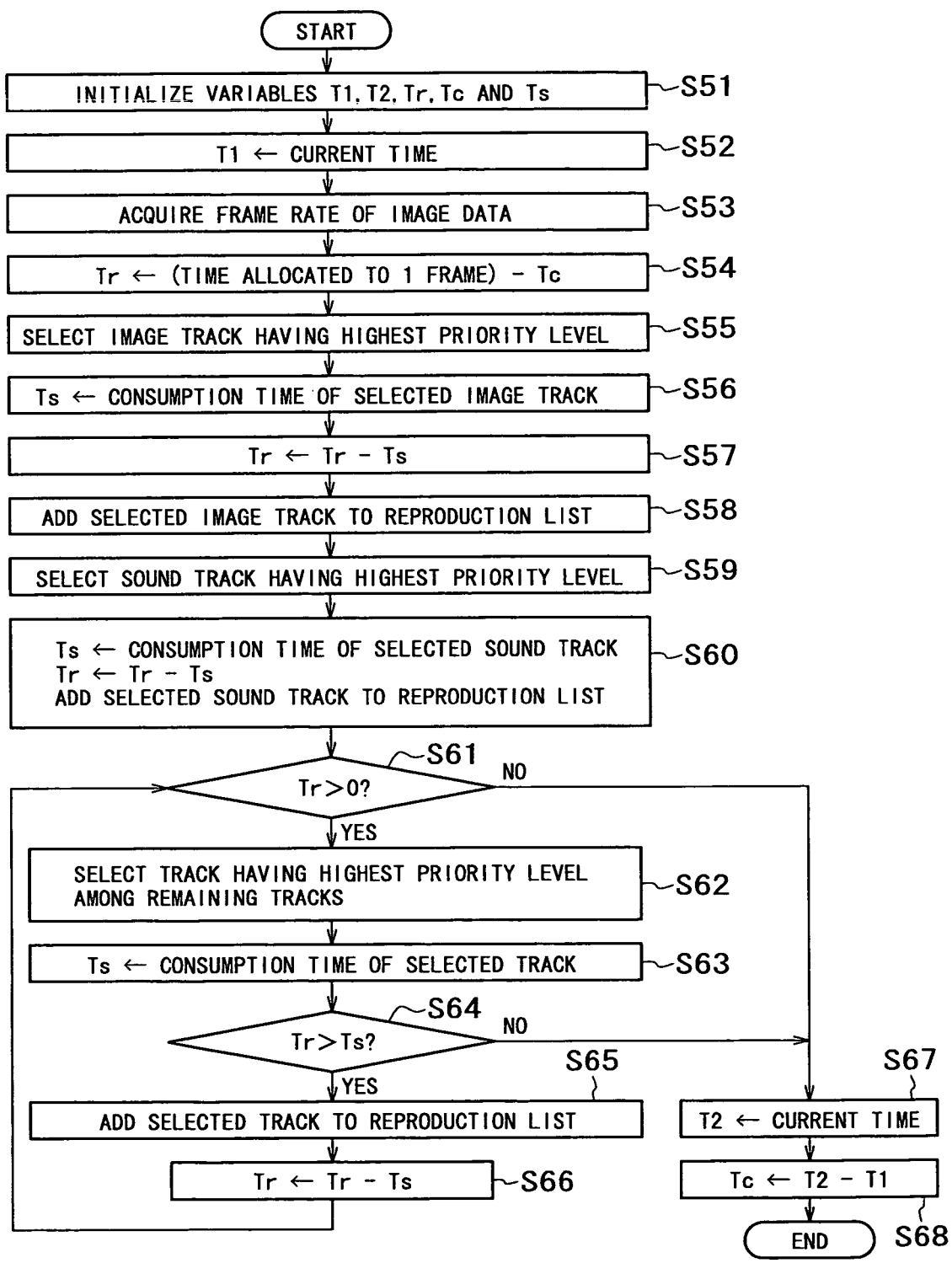

REPRODUCTION APPARATUS

BACKGROUND OF THE INVENTION

The present invention relates to a reproduction apparatus capable of reproducing view data including a plurality of tracks in an operation to reproduce the data from the tracks at a track count according to its own reproduction processing capacity.

In the production of video content, special effects are utilized in order to present a plurality of pieces of information, bring about a change to a screen changeover and protect privacy on screens. As editing techniques utilizing the special effects, there are a method of recording view data, to which the special effects have been applied, onto a recording medium, and a method whereby original view data is recorded as it is on a recording medium along with a processing procedure for special effects and, at a reproduction time, the original view data is processed in accordance with the processing procedure for the special effects in order to reproduce the special effects. The latter method is specially referred to as a non-destructive editing process. This editing method can be implemented by using application software such as Quick Time, which is referred to hereafter simply as QT.

In the non-destructive editing process, not only can the special effects be applied to an image, but superimposition of characters and graphics can also be described in a QT file format. To be more specific, it is possible to record onto a recording medium the distinction among special effects, characters and graphics in addition to the start time, end time and the ID of an image to be added by the special effects in the QT file format. Then, in a reproduction process, a special effect of a specified type or the like can be applied to a specified image before displaying the image at a specified time on a display unit. Thus, the editor is capable of reproducing an image exhibiting the same special effect as the one added in the editing process.

By the way, in such a non-destructive editing process, information including a large number of special effects and characters may be superposed on the original image data in some cases. In such cases, since the information, such as the numerous special effects, must be superposed at the same time on the original image data, the limit of the reproduction processing capacity of the reproduction apparatus per unit time may be exceeded. If the reproduction apparatus makes an attempt to reproduce all information such as the special effects applied to the original image in spite of the fact that the limit of the reproduction processing capacity has been exceeded, there will be raised a problem such as an uneven reproduced image or a lost frame.

It is thus an object of the present invention addressing the problem described above to provide a reproduction apparatus capable of reproducing view data properly within the range of the reproduction processing capacity of the reproduction apparatus by selectively narrowing display objects down to information such as special effects to be superposed at the same time on an original image on a priority basis within the range of the reproduction processing capacity.

SUMMARY OF THE INVENTION

As described above, since a reproduction apparatus provided by the present invention reproduces tracks in view data within the range of the reproduction processing capacity, an image can be reproduced in a smooth operation without losing a frame.

BRIEF DESCRIPTION OF THE DRAWINGS

FIG. 1 is a block diagram showing the configuration of a reproduction apparatus according to a first embodiment;

FIG. 2 is a diagram showing typical input data supplied to the first embodiment;

FIG. 3 shows a flowchart representing operations carried out by the reproduction apparatus according to the first embodiment;

FIGS. 4A and 4B are diagrams each showing a priority-level assignment table used in the first embodiment;

FIG. 5 is a block diagram showing the configuration of a reproduction apparatus according to a second embodiment;

FIG. 6 is a diagram showing typical input data supplied to the second embodiment;

FIG. 7 is a diagram showing a priority-level assignment table used in the second embodiment;

FIG. 9 is a diagram showing a priority-level assignment table used in the third embodiment;

FIG. 12 is a diagram showing a priority-level assignment table used in the fourth embodiment;

FIG. 13 shows a flowchart representing operations carried out by a data select unit employed in the fourth embodiment;

FIG. 14 shows a flowchart representing operations carried out by a data select unit employed in a fifth embodiment;

DETAILED DESCRIPTION

Figure 8:
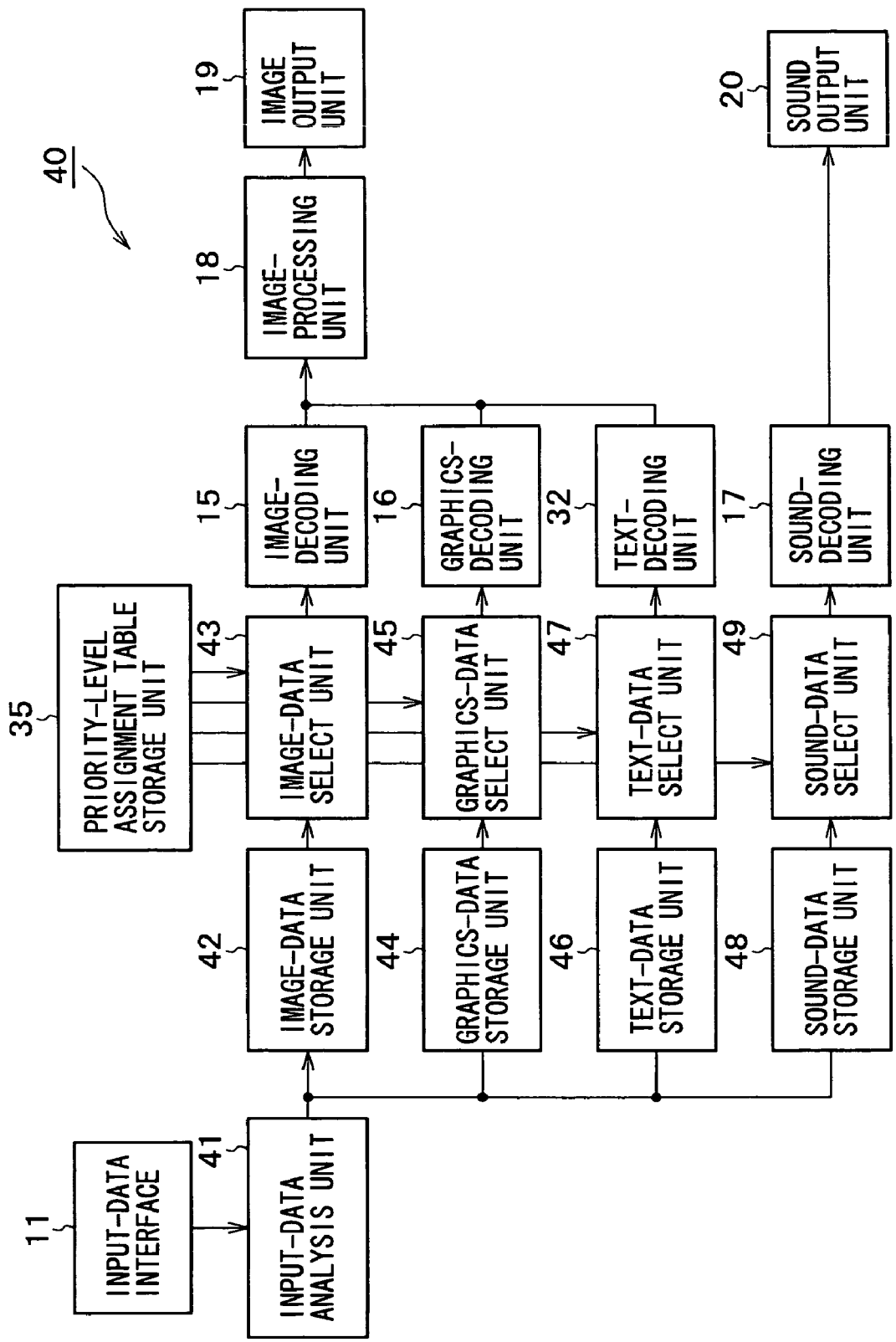
FIG. 8 is a block diagram showing the configuration of a reproduction apparatus according to a third embodiment.

Embodiments of the present invention are explained by referring to the diagrams as follows. It is to be noted that, throughout the diagrams, the same configuration elements are denoted by the same reference numerals and explained only once.

FIRST EMBODIMENT

A first embodiment is a reproduction apparatus for reproducing an image by selecting, in accordance with the reproduction processing capacity of the reproduction apparatus, a particular one of a variety of graphics, which are provided for an original image, as a particular graphic to be reproduced at the same time as the original image.

FIG. 1 is a block diagram showing the configuration of a reproduction apparatus 10 according to the first embodiment. The reproduction apparatus 10 includes an input-data interface 11, an input-data analysis unit 12, a priority-level assignment table storage unit 13, a priority-level identification unit 14, an image-decoding unit 15, a graphics-decoding unit 16, a sound-decoding unit 17, an image-processing unit 18, an image output unit 19 and a sound output unit 20.

The input-data interface 11 is an interface for connecting the reproduction apparatus 10 to an external apparatus and for inputting view data from an external source. Examples of the external apparatus are a drive apparatus for reading out view data from a disk-shaped recording medium, a CD drive apparatus for reading out view data from a CD-ROM, a DVD drive apparatus for reading out view data from a DVD and a hard-disk drive apparatus. The input view data is supplied to the input-data analysis unit 12.

The input-data analysis unit 12 determines the substance of the input view data and outputs a result of the determination to the priority-level identification unit 14 along with the view data. The result of the determination indicates that the input view data is video data, audio data, title graphics data, frame graphics data, shade graphics data or the like.

On the basis of the result of the determination, the priority-level identification unit 14 determines a reproduction priority level of the input view data in accordance with a predetermined threshold value by referring to a priority-level assignment table stored in the priority-level assignment table storage unit 13. In accordance with the determined effect of the reproduction priority level, the priority-level identification unit 14 discards the view data or, alternatively, outputs the view data to the image-decoding unit 15 or the graphics-decoding unit 16. If any two arbitrary tracks are selected from a plurality of tracks and the two tracks cannot be reproduced at the same time so that only one of the two tracks can be reproduced, the reproduction priority level is used to select the track that should take precedence over the other track.

A designer or manufacturer of the reproduction apparatus 10 determines the threshold value in advance on the basis of the reproduction processing capacity of hardware employed in the reproduction apparatus 10, and sets the threshold value in the priority-level identification unit 14. It is to be noted that the threshold value can also be stored in the priority-level assignment table storage unit 13 to be retrieved by the priority-level identification unit 14 when necessary.

The priority-level assignment table storage unit 13 is typically a read-only memory allowing data stored therein to be erased. An example of such a memory, which is used as a memory for storing a priority-level assignment table to be described later, is an EEPROM (Electrically Erasable Programmable Read-only Memory).

The image-decoding unit 15 decodes the input view data (which is video data) and outputs a result of the decoding process to the image-processing unit 18.

The graphics-decoding unit 16 decodes the input view data (which is graphics data) and outputs a result of the decoding process to the image-processing unit 18.

The image-processing unit 18 carries out predetermined graphic processing on an original image on the basis of the input video data and the input graphics data, outputting a result of the graphic processing to the image output unit 19.

The image output unit 19 carries out signal processing corresponding to an external display unit on view data before outputting the view data.

On the other hand, the sound-decoding unit 17 decodes input sound data (or input audio data) and outputs a result of the decoding process to the sound output unit 20.

The sound output unit 20 carries out signal processing corresponding to an external audio reproduction unit on the sound data before outputting the sound data.

Next, the operation of the reproduction apparatus 10 according to the first embodiment is explained.

FIG. 2 is a diagram showing typical input data supplied to the first embodiment.

FIG. 3 shows a flowchart representing operations carried out by the reproduction apparatus according to the first embodiment.

FIGS. 4A and 4B are diagrams each showing a priority-level assignment table used in the first embodiment. The priority-level assignment table shown in FIG. 4A is referred to hereafter as a first typical priority-level assignment table and the priority-level assignment table shown in FIG. 4B is referred to hereafter as a second typical priority-level assignment table.

First of all, input data is supplied to the input-data analysis unit 12 by way of the input-data interface 11. The input data is view data comprising video data, audio data and a plurality of types of graphics data. Each piece of data includes an identifier for identifying a track type used for distinguishing the substance of the data from the substance of other data. The types of graphics data include, for example, a title, which is a video headline, a frame defining the edges of a screen, a shade for hiding a portion of a screen beneath a shadow in order to protect privacy or for another purpose, a mark such as an arrow attached to a portion of a screen in order to draw attention to the portion, an accent added to a portion of a screen to put emphasis on the portion and a notice such as a displayed blowoff for stressing a caption or a phrase.

Such input data typically has a QT format. QT is software for managing various kinds of data on a time basis. The QT software serves as an extended function of the OS. This function is executed to synchronize data such as moving images, sound and text, and to display the data without using special hardware. In a QT file, a basic data unit is called an atom. QT comprises a resource atom and a data atom. A resource atom is information required for reproducing a QT file and information required for referencing actual data. On the other hand, a data atom is a portion for storing the actual data such as video and audio data. Each atom includes information on the size of the data and information on the type of data in addition to the data of the atom. In addition, in QT, the smallest unit of data is handled as a sample. A chunk is defined as a set of samples. QT is typically disclosed in, among others, Inside Macintosh: QuickTime (a Japanese version) (Addison-Wesley).

For example, the input data comprises a resource atom 101 and a data atom 102, as shown in FIG. 2. The data atom 102 comprises various kinds of actual data including video data 121; audio data 122; graphics data (title) 123, which is graphics data of a title; graphics data (frame) 124, which is graphics data of a frame; graphics data (shade) 125, which is graphics data of a shade; graphics data (mark) 126, which is graphics data of a mark; graphics data (accent) 127, which is graphics data of an accent; and graphics data (notice) 128, which is graphics data of a notice. Used for managing these pieces of actual data on a time basis, the resource atom 101 comprises a track atom (video) 111, a track atom (audio) 112, a track atom (title) 113, a track atom (frame) 114, a track atom (shade) 115, a track atom (mark) 116, a track atom (accent) 117 and a track atom (notice) 118. In addition, an identifier for identifying the track type of the actual data is prescribed in a track property atom, which is an atom for prescribing attributes of a track. The track property atom is provided in a user data atom within a track atom for actual data. A user data atom is a QT atom for prescribing data defined by the user.

The input-data analysis unit 12 determines the track type of the actual data by referencing an identifier prescribed in this track property atom and outputs a result of the determination to the priority-level identification unit 14.

When the priority-level identification unit 14 receives the result of the determination and the actual data, at step S11 of the flowchart shown in FIG. 3, the priority-level identification unit 14 accesses the priority-level assignment table storage unit 13 to acquire a priority level.

A priority level is a sequence number assigned to the type of graphics to be superposed on an original image. A typical assignment of priority levels is shown in FIG. 4A. As shown in the figure, a priority level of 1 is assigned to the title track type, a priority level of 5 is assigned to the frame track type, a priority level of 2 is assigned to the shade track type, a priority level of 6 is assigned to the mark track type, a priority level of 4 is assigned to the accent track type and a priority level of 3 is assigned to the notice track type. It is to be noted that, the smaller the sequence number representing a priority level, the higher the priority level and, conversely, the larger the sequence number, the lower the priority level. The figure does not show the fact that the highest priority level of 1 is assigned to video data 121 and audio data 122.

Then, the priority-level identification unit 14 determines what type of actual data the input actual data is on the basis of the result of the determination. Subsequently, the priority-level identification unit 14 obtains the priority level corresponding to that type of actual data from the priority-level assignment table. Then, at the next step S12, the priority-level identification unit 14 compares the priority level of the actual data with a threshold value.

If the result of the comparison indicates that the priority level of the actual data is higher than the threshold value (lower sequence number), the flow of the operation goes on to step S13 at which the priority-level identification unit 14 outputs the actual data to the image-decoding unit 15, the graphics-decoding unit 16 or the sound-decoding unit 17 depending on the type of the actual data. If the result of the comparison indicates that the priority level of the actual data is lower than the threshold value (higher sequence number), on the other hand, the actual data is discarded.

For example, the threshold value may be set at a typical value of 3 according to the simultaneous reproduction processing capacity of the reproduction apparatus 10. In this case, video data 121, audio data 122, graphics data (title) 123 and graphics data (shade) 125 are supplied to the image-decoding unit 15, the graphics-decoding unit 16 or the sound-decoding unit 17. Then, the image-processing unit 18 carries out a process to superpose the graphics data (title) 123 and the graphics data (shade) 125 on the decoded video data 121 to generate display data and output the display data to the image output unit 19.

As another example, the threshold value may be set at a typical value of 5 according to the simultaneous reproduction processing capacity of the reproduction apparatus 10. In this case, video data 121, audio data 122, graphics data (title) 123, graphics data (shade) 125, graphics data (accent) 127 and graphics data (notice) 128 are supplied to the image-decoding unit 15, the graphics-decoding unit 16 or the sound-decoding unit 17. Then, the image-processing unit 18 carries out a process to superpose the graphics data (title) 123, the graphics data (shade) 125, the graphics data (accent) 127 and the graphics data (notice) 128 on the decoded video data 121 to generate display data and output the display data to the image output unit 19.

As described above, in the first embodiment, actual data is reproduced within the processing capacity of the reproduction apparatus 10 in accordance with priority levels. Thus, view data can be reproduced in a smooth operation and without losing a frame. In addition, since actual data is reproduced within the processing capacity of the reproduction apparatus 10 in accordance with priority levels, it is not necessary to adjust the view data to the processing capacity of the reproduction apparatus 10. Thus, view data common to multiple reproduction apparatus can be utilized even if the reproduction apparatus have processing capacities different from each other. In addition, by assigning different priority levels to different types of graphics, it is possible to reproduce an image with different graphics superposed thereon even for the same processing capacity.

The first priority-level assignment table of FIG. 4A shows that priority levels assigned to graphics data are fixed without regard to the number of graphics to be superposed on a display at the same time. Thus, if the actual data to be reproduced at the same time is video data 121, audio data 122 and graphics data (frame) 124, and the threshold value is set at 3, then since the priority level of the graphics data (frame) 124 is 5, the graphics data (frame) 124 is not output to the graphics-decoding unit 16, even if the reproduction apparatus 10 still has available capacity for processing. That is to say, only the video data 121 and the audio data 122 are reproduced. In order to solve this problem, it is nice to employ the second priority-level assignment table shown in FIG. 4B as a substitute for the first priority-level assignment table.

The second priority-level assignment table shown in FIG. 4B prescribes priority levels assigned to graphics to be processed at the same time in accordance with tracks of the graphics.

The first row of the second priority-level assignment table shows priority levels assigned to graphics for the case in which the tracks of the graphics are the frame, the shade, the mark, the accent and the notice, which are simultaneously processed. In this case, a priority level of 1 is assigned to the frame track type, a priority level of 5 is assigned to the shade track type, a priority level of 2 is assigned to the mark track type, a priority level of 3 is assigned to the accent track type and a priority level of 4 is assigned to the notice track type. The second row of the second priority-level assignment table shows priority levels assigned to graphics for the case in which the tracks of the graphics are the title, the frame and the shade, which are simultaneously processed. In this case, a priority level of 1 is assigned to the title track type, a priority level of 2 is assigned to the frame track type and a priority level of 2 is also assigned to the shade track type. Similar assignment of priority levels to track types is applied to the third and subsequent rows of the second priority-level assignment table. Finally, the last row of the second priority-level assignment table shows priority levels assigned to graphics for the case in which the tracks of the graphics are the mark, the accent and the notice, which are simultaneously processed. In this case, a priority level of 1 is assigned to the mark track type, a priority level of 2 is assigned to the accent track type and a priority level of 3 is assigned to the notice track type.

In the reproduction apparatus 10 using such a second priority-level assignment table, if the tracks of input view data are the video data 121, the audio data 122, the graphics data (frame) 124, the graphics data (shade) 125, the graphics data (mark) 126, the graphics data (accent) 127 and the graphics data (notice) 128, the priority-level identification unit 14 applies the priority levels prescribed in the first row of the second priority-level assignment table in executing the processes at steps S12 and S13 shown in FIG. 3. Thus, if the pieces of view data to be processed at the same time are the video data 121, the audio data 122, the graphics data (frame) 124, the graphics data (shade) 125, the graphics data (mark) 126, the graphics data (accent) 127 and the graphics data (notice) 128, and the threshold value is set at 3, the graphics data (shade) 125, the graphics data (accent) 127 and graphics data (notice) 128 are not reproduced.

If the tracks of input view data are the video data 121, the audio data 122, the graphics data (title) 123, the graphics data (frame) 124 and the graphics data (shade) 125, on the other hand, the priority-level identification unit 14 applies the priority levels prescribed in the second row of the second priority-level assignment table in executing the processes at steps S12 and S13 shown in FIG. 3. In accordance with the second row, the frame and the shade both have a priority level of 2. Thus, if these pieces of graphics data are received at the same time, they will both be discarded.

Next, another embodiment is explained.

SECOND EMBODIMENT

In the case of the first embodiment, only the graphics data comprises a plurality of tracks. In the case of the second embodiment, data comprising a plurality of tracks is not only the graphics data, but also audio data, text data and other data.

FIG. 5 is a block diagram showing the configuration of a reproduction apparatus 30 according to the second embodiment. The reproduction apparatus 30 includes an input-data interface 11, an input-data analysis unit 12, a priority-level identification unit 31, a priority-level assignment table storage unit 33, an image-decoding unit 15, a graphics-decoding unit 16, a text-decoding unit 32, a sound-decoding unit 17, an image-processing unit 18, an image output unit 19 and a sound output unit 20.

The input-data interface 11 is connected to the input-data analysis unit 12 and the input-data analysis unit 12 is connected to the priority-level identification unit 31. The priority-level identification unit 31 is connected to the priority-level assignment table storage unit 33, the image-decoding unit 15, the graphics-decoding unit 16, the text-decoding unit 32 and the sound-decoding unit 17.

The image-decoding unit 15, the graphics-decoding unit 16 and the text-decoding unit 32 are connected to the image-processing unit 18. The text-decoding unit 32 decodes input view data (which is text data) and outputs a result of the decoding process to the image-processing unit 18.

The image-processing unit 18 is connected to the image output unit 19, whereas the sound-decoding unit 17 is connected to the sound output unit 20.

Next, the operation of the reproduction apparatus 30 according to the second embodiment is explained.

FIG. 6 is a diagram showing typical input data supplied to the second embodiment. FIG. 7 is a diagram showing a priority-level assignment table used in the second embodiment.

First of all, input data is supplied to the input-data analysis unit 12 by way of the input-data interface 11. The input data is view data comprising one or more pieces of video data, one or more pieces of audio data, one or more pieces of graphics data and one or more pieces of text data. Each of the pieces of data includes an identifier indicating the track type of the piece of data.

For example, the input data comprises a resource atom 151 and a data atom 152, as shown in FIG. 6. The data atom 152 comprises pieces of actual data, which include video-1 data 181, audio-1 data 182, audio-2 data 183, audio-3 data 184, graphics-1 data 185, graphics-2 data 186, text-1 data 187, text-2 data 188, text-3 data 189 and text-4 data 190. Used for associating these pieces of actual data with each other and managing these pieces of actual data on a time basis, the resource atom 151 comprises a track atom (video-1) 161, a track atom (audio-1) 162, a track atom (audio-2) 163, a track atom (audio-3) 164, a track atom (graphics-1) 165, a track atom (graphics-2) 166, a track atom (text-1) 167, a track atom (text-2) 168, a track atom (text-3) 169 and a track atom (text-4) 170. An identifier indicating the type of the actual data is prescribed in a track property atom which is provided within a track atom for the actual data.

The input-data analysis unit 12 determines the track type of the actual data by referencing an identifier prescribed in this track property atom and outputs a result of the determination to the priority-level identification unit 31.

When the priority-level identification unit 31 receives the result of the determination and the actual data, the priority-level identification unit 31 accesses the priority-level assignment table storage unit 33 to acquire a priority level.

A priority level is a sequence number assigned to each track type. A typical assignment of priority levels is shown in FIG. 7. As shown in the figure, a priority level of 1 is assigned to the track atom (video-1), a priority level of 2 is assigned to the track atom (audio-1), a priority level of 5 is assigned to the track atom (audio-2), a priority level of 7 is assigned to the track atom (audio-3), a priority level of 6 is assigned to the track atom (graphics-1), a priority level of 8 is assigned to the track atom (graphics-2), a priority level of 3 is assigned to the track atom (text-1), a priority level of 4 is assigned to the track atom (text-2), a priority level of 9 is assigned to the track atom (text-3) and a priority level of 10 is assigned to the track atom (text-4). It is to be noted that, the smaller the sequence number representing a priority level, the higher the priority level and, conversely, the larger the sequence number, the lower the priority level.

Then, the priority-level identification unit 31 determines what type of actual data the input actual data is on the basis of the result of the determination. Subsequently, the priority-level identification unit 31 obtains the priority level corresponding to that type of actual data from the priority-level assignment table. Then, the priority-level identification unit 31 compares the priority level of the actual data with a threshold value.

If the result of the comparison indicates that the priority level of the actual data is higher than the threshold value, the priority-level identification unit 31 outputs the actual data to the image-decoding unit 15, the graphics-decoding unit 16, the text-decoding unit 32 or the sound-decoding unit 17 depending on the type of the actual data. If the result of the comparison indicates that the priority level of the actual data is lower than the threshold value, on the other hand, the actual data is discarded.

For example, the threshold value may be set at a typical value of 5 according to the simultaneous reproduction processing capacity of the reproduction apparatus 30. In this case, video-1 data 181, audio-1 data 182, text-1 data 187 and text-2 data 188 are supplied to the image-decoding unit 15, the sound-decoding unit 17 or the text-decoding unit 32. Then, the image-processing unit 18 carries out a process to superpose the text-1 data 187 and the text-2 data 188 on the decoded video-1 data 181 to generate display data and output the display data to the image output unit 19.

As another example, the threshold value may be set at a typical value of 7 according to the simultaneous reproduction processing capacity of the reproduction apparatus 30. In this case, video-1 data 181, audio-1 data 182, audio-2 data 183, graphics-1 data 185, text-1 data 187 and text-2 data 188 are supplied to the image-decoding unit 15, the graphics-decoding unit 16, the sound-decoding unit 17 or the text-decoding unit 32. Then, the image-processing unit 18 carries out a process to superpose the graphics-1 data 185, the text-1 data 187 and the text-2 data 188 on the decoded video-1 data 181 to generate display data and output the display data to the image output unit 19.

As described above, in the second embodiment, actual data is reproduced within the processing capacity of the reproduction apparatus 30 in accordance with priority levels. Thus, view data can be reproduced in a smooth operation and without losing a frame. In addition, since actual data is reproduced within the processing capacity of the reproduction apparatus 30 in accordance with priority levels, it is not necessary to adjust the view data to the processing capacity of the reproduction apparatus 30. Thus, view data common to multiple reproduction apparatus can be utilized even if the reproduction apparatus have processing capacities different from each other. In addition, by assigning different priority levels to different types of graphics, it is possible to reproduce an image with different graphics superposed thereon even for the same processing capacity.

Furthermore, by providing a plurality of pieces of audio data, it is possible to keep up with monaural reproduction and stereo reproduction. On top of that, by providing a plurality of pieces of text data, a caption can be displayed in a plurality of languages.

Next, another embodiment is explained.

THIRD EMBODIMENT

In the second embodiment using the second priority-level assignment table, the priority-level identification unit 31 selects a threshold value in accordance with the types of input data and compares the priority level assigned to a track with the threshold value. The priority-level identification unit 31 then determines whether data of the track is to be output to decoding units or discarded depending on the result of the comparison. In the case of the third embodiment, priority-level determination means is provided for every type of data and the priority level assigned to input data is identified for each type of data.

FIG. 8 is a block diagram showing the configuration of a reproduction apparatus 40 according to the third embodiment. The reproduction apparatus 40 includes an input-data interface 11, an input-data analysis unit 41, a priority-level assignment table storage unit 35, an image-data storage unit 42, a graphics-data storage unit 44, a text-data storage unit 46, a sound-data storage unit 48, an image-data select unit 43, a graphics-data select unit 45, a text-data select unit 47, a sound-data select unit 49, an image-decoding unit 15, a graphics-decoding unit 16, a text-decoding unit 32, a sound-decoding unit 17, an image-processing unit 18, an image output unit 19 and a sound output unit 20.

The input-data interface 11 is connected to the input-data analysis unit 41. The input-data analysis unit 41 is connected to the image-data storage unit 42, the graphics-data storage unit 44, the text-data storage unit 46 and the sound-data storage unit 48. The input-data analysis unit 41 supplies input data to the image-data storage unit 42, the graphics-data storage unit 44, the text-data storage unit 46 or the sound-data storage unit 48 depending on the type of the input data.

Connected to the image-data select unit 43, the image-data storage unit 42 is a memory for storing video input data. Connected to the graphics-data select unit 45, the graphics-data storage unit 44 is a memory for storing graphics input data. Connected to the text-data select unit 47, the text-data storage unit 46 is a memory for storing text input data. Connected to the sound-data select unit 49, the sound-data storage unit 48 is a memory for storing audio input data.

Connected to the priority-level assignment table storage unit 35 and the image-decoding unit 15, the image-data select unit 43 searches a priority-level assignment table stored in the priority-level assignment table storage unit 35 for the priority level assigned to the track type indicated by the result of the determination as a reproduction priority level of the input view data, and determines the effect of the priority level by comparing it to a threshold value determined in advance. The image-data select unit 43 either discards the image data or supplies the image data to the image-decoding unit 15 in accordance with the result of the comparison.

Connected to the priority-level assignment table storage unit 35 and the graphics-decoding unit 16, the graphics-data select unit 45 searches the priority-level assignment table stored in the priority-level assignment table storage unit 35 for the priority level assigned to the track type indicated by the result of the determination as a reproduction priority level of the input view data, and determines the effect of the priority level by comparing it to a threshold value determined in advance. The graphics-data select unit 45 either discards the graphics data or supplies the graphics data to the graphics-decoding unit 16 in accordance with the result of the comparison.

Connected to the priority-level assignment table storage unit 35 and the text-decoding unit 32, the text-data select unit 47 searches the priority-level assignment table stored in the priority-level assignment table storage unit 35 for the priority level assigned to the track type indicated by the result of the determination as a reproduction priority level of the input view data, and determines the effect of the priority level by comparing it to a threshold value determined in advance. The text-data select unit 47 either discards the text data or supplies the text data to the text-decoding unit 32 in accordance with the result of the comparison.

Connected to the priority-level assignment table storage unit 35 and the sound-decoding unit 17, the sound-data select unit 49 searches the priority-level assignment table stored in the priority-level assignment table storage unit 35 for the priority level assigned to the track type indicated by the result of the determination as a reproduction priority level of the input view data, and determines the effect of the priority level by comparing it to a threshold value determined in advance. The sound-data select unit 49 either discards the sound data or supplies the sound data to the sound-decoding unit 17 in accordance with the result of the comparison.

The image-decoding unit 15, the graphics-decoding unit 16 and the text-decoding unit 32 are connected to the image-processing unit 18, which is connected to the image output unit 19. The sound-decoding unit 17 is connected to the sound output unit 20.

A typical priority-level assignment table like the one shown in FIG. 9 is stored in the priority-level assignment table storage unit 35. As shown in the figure, a threshold value is assigned to each data type whereas a priority level is assigned to each data sub-type.

FIG. 9 is a diagram showing a priority-level assignment table employed in the third embodiment. In the priority-level assignment table shown in FIG. 9, a threshold value is assigned to each data type whereas a priority level is assigned to each track of every data type.

For example, in the priority-level assignment table, a threshold value of 2 is assigned to the video data type and a priority level of 1 is assigned to the video-1 track. A threshold value of 3 is assigned to the audio data type, whereas a priority level of 1 is assigned to the audio-1 track type, a priority level of 4 is assigned to the audio-2 track type, a priority level of 3 is assigned to the audio-3 track type and a priority level of 2 is assigned to the audio-4 track type. A threshold value of 3 is also assigned to the graphics data type, whereas a priority level of 1 is assigned to the graphics-1 track type, a priority level of 4 is assigned to the graphics-2 track type and a priority level of 2 is assigned to the graphics-3 track type. A threshold value of 2 is assigned to the text data type, whereas a priority level of 1 is assigned to the text-1 track type, a priority level of 3 is assigned to the text-2 track type, a priority level of 5 is assigned to the text-3 track type and a priority level of 6 is assigned to the text-4 track type.

Next, the operation of the reproduction apparatus according to the third embodiment is explained.

Figure 10:
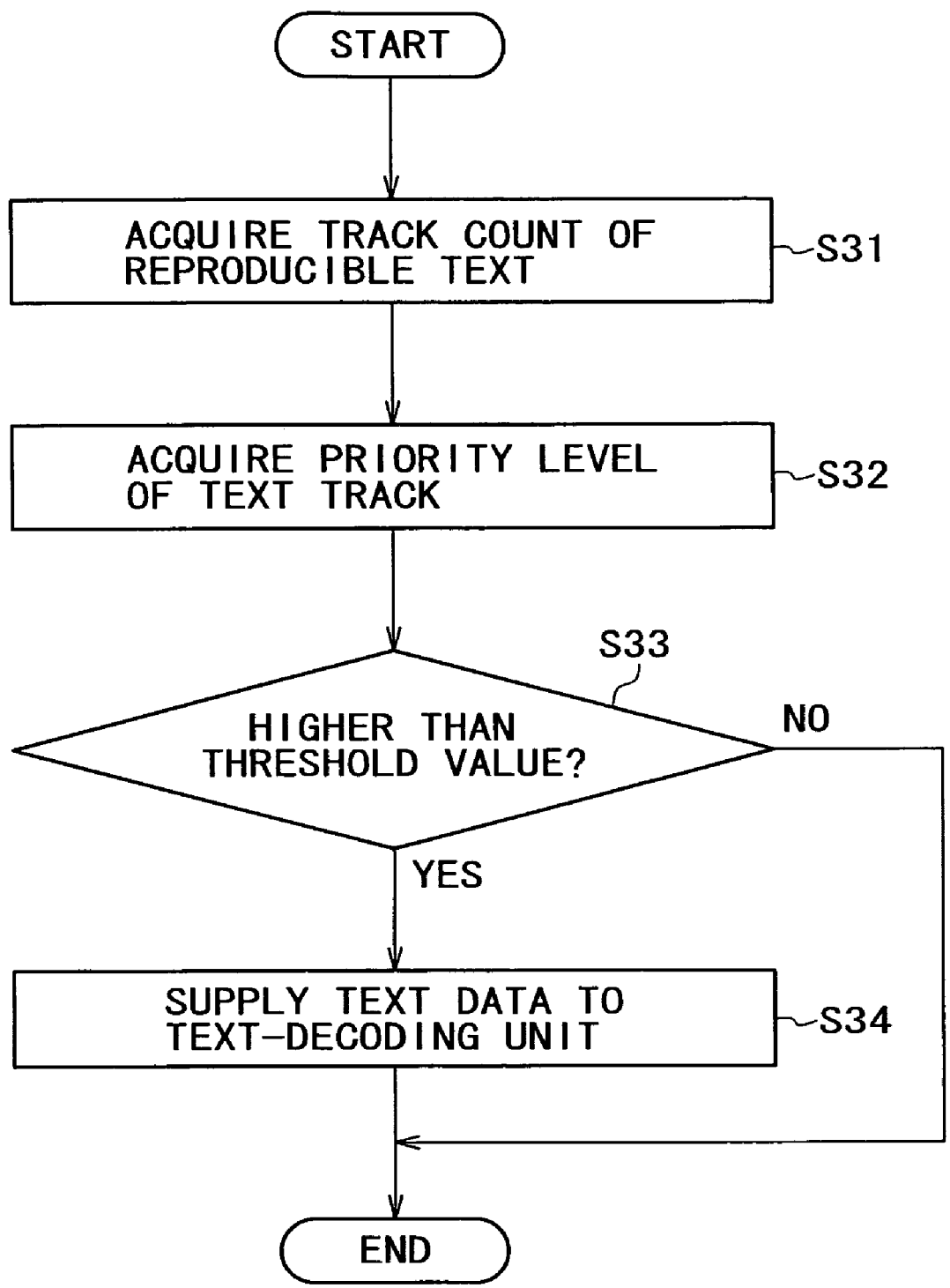
FIG. 10 shows a flowchart representing operations carried out by a text-data select unit employed in the third embodiment.

FIG. 10 shows a flowchart representing operations carried out by a text-data select unit employed in the third embodiment.

First of all, input data is supplied to the input-data analysis unit 41 by way of the input-data interface 11.

The input-data analysis unit 41 determines the type of input actual data by referring to an identifier prescribed in a track property atom and supplies the input data along with the result of the determination to the image-data storage unit 42, the graphics-data storage unit 44, the text-data storage unit 46 or the sound-data storage unit 48 depending on the result of the determination.

The image-data select unit 43, the graphics-data select unit 45, the text-data select unit 47 and the sound-data select unit 49 are different from each other in the types of data handled. Since the image-data select unit 43, the graphics-data select unit 45, the text-data select unit 47 and the sound-data select unit 49 carry out the same processing, however, only the operation of the text-data select unit 47 is explained below as representative of all four select units.

When the result of the determination and the actual data are supplied from the text-data storage unit 46, the operation represented by the flowchart shown in FIG. 10 begins with step S31, at which the text-data select unit 47 accesses the priority-level assignment table storage unit 35 to acquire the track count of the reproducible text (the threshold value of the text data stored in the text-data storage unit 46).

Then, at the next step S32, the text-data select unit 47 accesses the priority-level assignment table storage unit 35 to acquire the priority level of the text data.

Subsequently, at the next step S33, the text-data select unit 47 refers to the acquired threshold value and the acquired priority level and compares the two.

If the result of the comparison indicates that the priority level of the text data of the actual data is higher than the threshold value, the flow of the operation goes on to step S34 at which the text data of the actual data is output to the text-decoding unit 32. If the result of the comparison indicates that the priority level of the text data of the actual data is lower than the threshold value, on the other hand, the text data of the actual data is discarded.

As described above, in the third embodiment, since the number of reproducible tracks is prescribed for each data type, actual data can be reproduced properly within the reproduction processing capacity of the reproduction apparatus. In particular, since the amount of data to be processed in a unit time varies from data type to data type, a threshold value appropriate for each data type can be determined.

Next, another embodiment is explained.

FOURTH EMBODIMENT

In the embodiment described above, if tracks of all the data types do not exist, the reproduction processing capacity of the reproduction apparatus is not fully utilized. In order to solve this problem, a fourth embodiment is provided in which each piece of data is reproduced in accordance with the priority level of the data so that the amount of unutilized reproduction processing capacity is reduced to a minimum.

Figure 11:
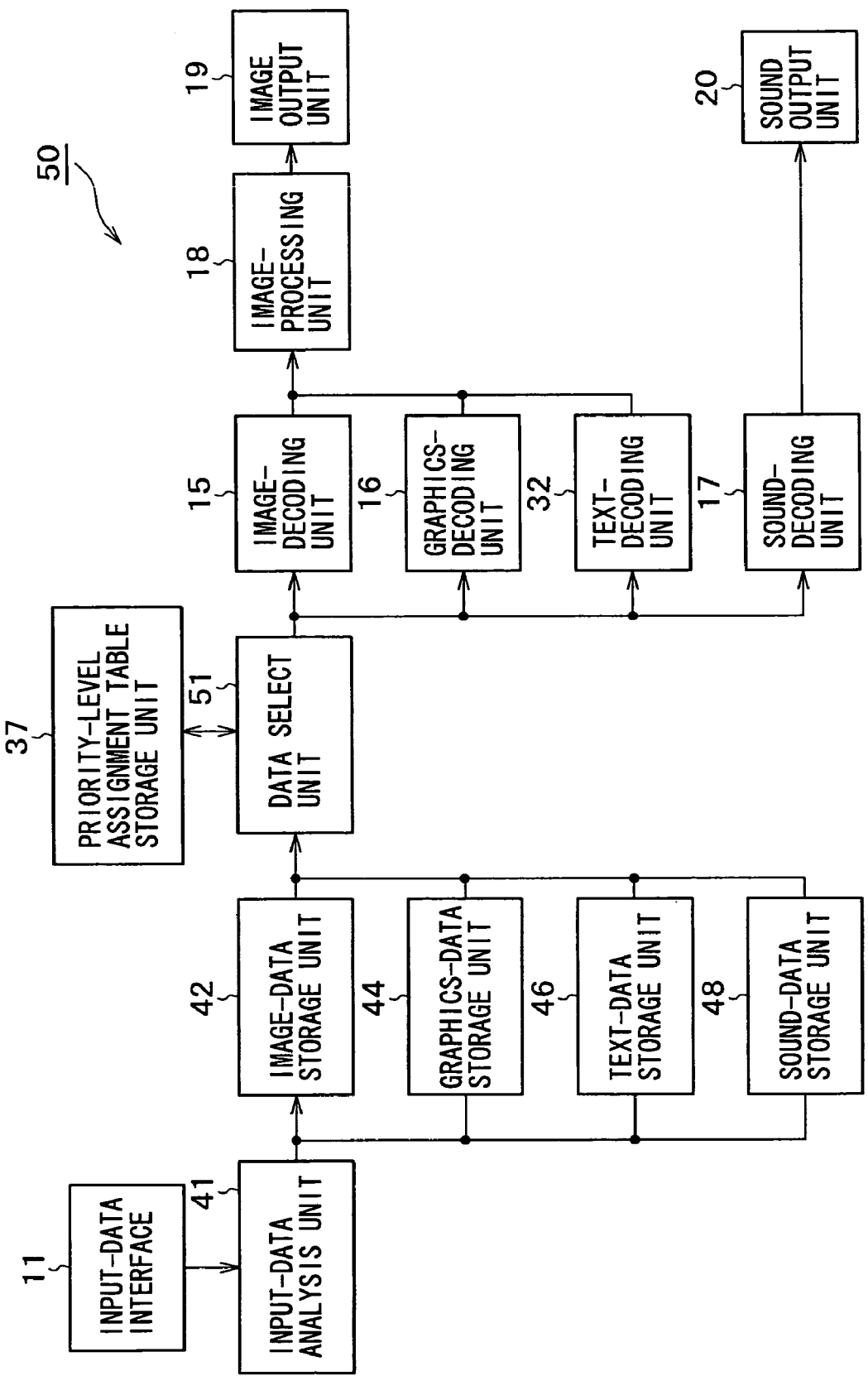
FIG. 11 is a block diagram showing the configuration of a reproduction apparatus according to a fourth embodiment.

FIG. 11 is a block diagram showing the configuration of a reproduction apparatus 50 according to the fourth embodiment. The reproduction apparatus 50 includes an input-data interface 11, an input-data analysis unit 41, an image-data storage unit 42, a graphics-data storage unit 44, a text-data storage unit 46, a sound-data storage unit 48, a data select unit 51, a priority-level assignment table storage unit 37, an image-decoding unit 15, a graphics-decoding unit 16, a text-decoding unit 32, a sound-decoding unit 17, an image-processing unit 18, an image output unit 19 and a sound output unit 20.

The input-data interface 11 is connected to the input-data analysis unit 41. The input-data analysis unit 41 is connected to the image-data storage unit 42, the graphics-data storage unit 44, the text-data storage unit 46 and the sound-data storage unit 48.

The image-data storage unit 42, the graphics-data storage unit 44, the text-data storage unit 46 and the sound-data storage unit 48 are connected to the data select unit 51.

As will be described later, the data select unit 51 supplies actual data to the image-decoding unit 15, the graphics-decoding unit 16, the text-decoding unit 32 or the sound-decoding unit 17 or, alternatively, discards the actual data depending on the reproduction processing capacity of the reproduction apparatus 50, the priority level of the actual data and the existence/non-existence of the priority level. If necessary, the data select unit 51 retrieves a maximum reproduction processing capacity (MaxTrack) and the priority level of the actual data from the priority-level assignment table storage unit 37.

For the reason described above, the priority-level assignment table storage unit 37 is used as a memory for storing a priority-level assignment table showing the priority levels assigned to all tracks without regard to the types of the tracks.

FIG. 12 is a diagram showing a typical priority-level assignment table used in the fourth embodiment. As is obvious from the table shown in FIG. 12, a priority level of 1 is assigned to the video-1 track type, a priority level of 9 is assigned to the video-2 track type, a priority level of 6 is assigned to the audio-1 track type, a priority level of 2 is assigned to the audio-2 track type, a priority level of 11 is assigned to the audio-3 track type, a priority level of 12 is assigned to the audio-4 track type, a priority level of 4 is assigned to the graphics-1 track type, a priority level of 10 is assigned to the graphics-2 track type, a priority level of 5 is assigned to the graphics-3 track type, a priority level of 15 is assigned to the graphics-4 track type, a priority level of 17 is assigned to the graphics-5 track type, a priority level of 3 is assigned to the text-1 track type, a priority level of 7 is assigned to the text-2 track type, a priority level of 8 is assigned to the text-3 track type, a priority level of 13 is assigned to the text-4 track type, a priority level of 14 is assigned to the text-5 track type and a priority level of 16 is assigned to the text-6 track type. It is to be noted that, the smaller the number representing a priority level, the higher the priority level and, conversely, the larger the number, the lower the priority level.

The image-decoding unit 15, the graphics-decoding unit 16 and the text-decoding unit 32 are connected to the image-processing unit 18. The image-processing unit 18 is connected to the image output unit 19. The sound-decoding unit 17 is connected to the sound output unit 20.

Next, the operation of the reproduction apparatus according to the fourth embodiment is explained.

FIG. 13 shows a flowchart representing operations carried out by the reproduction apparatus according to the fourth embodiment.

First of all, input data is supplied to the input-data analysis unit 41 by way of the input-data interface 11.

The input-data analysis unit 41 determines the type of input actual data by referring to an identifier prescribed in a track property atom and supplies the input data along with the result of the determination to the image-data storage unit 42, the graphics-data storage unit 44, the text-data storage unit 46 or the sound-data storage unit 48 depending on the result of the determination.

The flowchart shown in FIG. 13 begins with step S41 at which the data select unit 51 accesses the priority-level assignment table storage unit 37 to acquire the MaxTrack of the reproduction apparatus 50.

Then, at the next step S42, the data select unit 51 accesses the priority-level assignment table storage unit 37 to identify a video-data track having the highest priority level and retrieves the video data for the track from the image-data storage unit 42.

Subsequently, at the next step S43, the data select unit 51 subtracts a part of the reproduction processing capacity, which already has been allocated to the video data, from the MaxTrack.

Then, at the next step S44, the data select unit 51 accesses the priority-level assignment table storage unit 37 to identify an audio-data track having the highest priority level and retrieves the audio data for the track from the sound-data storage unit 48.

Subsequently, at the next step S45, the data select unit 51 subtracts a part of the reproduction processing capacity, which has already been allocated to the audio data, from the MaxTrack.

In this way, the smallest amount of the capacity needed to reproduce an image can be preserved. This is because the reproduction processing capacity has been allocated to the video data and the audio data, which take precedence over others.

Then, at the next step S46, the data select unit 51 determines whether the relation MaxTrack>0 holds true, that is, whether any reproduction processing capacity is left in the reproduction apparatus 50.

If the result of the determination indicates that the relation MaxTrack>0 holds true, that is, reproduction processing capacity is still available in the reproduction apparatus 50, the flow of the operation goes on to step S47 at which the data select unit 51 accesses the priority-level assignment table storage unit 37 to select the track of the actual data having the highest priority level among the tracks stored in the storage units as tracks with no reproduction processing capacity allocated thereto yet.

Subsequently, at the next step S48, the data select unit 51 allocates a part of the reproduction processing capacity to the selected actual data and subtracts the allocated part of the reproduction processing capacity from the MaxTrack.

If the result of the determination indicates that the relation MaxTrack≦0 holds true, on the other hand, that is, no reproduction processing capacity is left in the reproduction apparatus 50, the operation to select a track to be reproduced is ended.

As described above, the fourth embodiment sequentially selects a data track having the highest priority level among the tracks stored in the storage units as tracks with no reproduction processing capacity allocated thereto yet as long as there is reproduction processing capacity still left. Thus, the reproduction processing capacity of the reproduction apparatus 50 can all be utilized with no portion of the reproduction processing capacity left unused.

Next, another embodiment is explained.

FIFTH EMBODIMENT

In the fourth embodiment, there is a point of view at which the data select unit is made capable of determining a reproducible track with ease. From this point of view, the reproduction processing capacity displayed by the reproduction apparatus as the reproduction processing capacity required for processing the data of tracks is regarded as a uniform capacity for all the tracks. For this reason, a reproducible track is determined only on the basis of a track count. In the case of a fifth embodiment, on the other hand, a reproducible track is determined by considering the time it takes to carry out a process to reproduce the track. Thus, the fifth embodiment is capable of utilizing the reproduction processing capacity of the reproduction apparatus with an even higher degree of efficiency than the fourth embodiment.

Thus, the reproduction apparatus according to the fifth embodiment is provided with a priority-level assignment table storage unit 37 which has not only a non-volatile storage circuit for storing a priority-level assignment table, but also a writable storage circuit for storing different pieces of data required in processing and a timer connected to the data select unit 51 as a timer-displaying means, none of which is shown in the figures. An example of the writable storage circuit is a RAM (Random-Access Memory). The data select unit 51 is a component for carrying out a process represented by the flowchart shown in FIG. 14. Since the data select unit 51 has the same configuration as the one shown in FIG. 11, the configuration of the data select unit 51 is not explained.

In addition, a uniform unit time of the reproduction processing is assumed for this embodiment. In the case of QT, an example of the unit time is the product of a time scale and a sample duration.

Next, the operation of the reproduction apparatus according to the fifth embodiment is explained.

FIG. 14 shows a flowchart representing operations carried out by a data select unit employed in the fifth embodiment.

First of all, input data is supplied to the input-data analysis unit 41 by way of the input-data interface 11. The input-data analysis unit 41 determines the type of input actual data by referring to an identifier prescribed in a track property atom and supplies the input data along with the result of the determination to the image-data storage unit 42, the graphics-data storage unit 44, the text-data storage unit 46 or the sound-data storage unit 48 depending on the result of the determination.

The flowchart shown in FIG. 14 begins with step S51 at which the data select unit 51 initializes variables such as T1, T2, Tr, Tc and Ts.

Then, at the next step S52, the data select unit 51 obtains the current time from the timer and sets the current time in the variable T1.

Subsequently, at the next step S53, the data select unit 51 acquires a frame rate of video data (image data) as a result of the calculation from a time-to-sample atom and a media handler atom.

Then, at the next step S54, the data select unit 51 calculates a processing time allocated to a process to reproduce one frame, subtracts a compensation time Tc from the processing time and sets the result of the subtraction in the variable Tr. The compensation time Tc is the time it takes to carry out a process including an operation to select a track. Thus, the variable Tr is an effective time allocated to reproduce one frame.

The compensation time Tc is stored in the priority-level assignment table storage unit 37 as an initial value determined in advance. Thereafter, the initial value is changed to a time actually required during the operation of the reproduction apparatus. The predetermined initial value is typically found as follows. A plurality of pieces of input data are prepared. The pieces of input data each include a track count. The number of pieces of input data is set at such a value that a process always needs to be carried out to select one of the tracks. In addition, it takes a long time to identify and select a track having a high priority level. Then, the pieces of input data are each supplied to the reproduction apparatus, and the time it takes to identify and select a track having a high priority level is measured for each piece of input data. Finally, the longest time from among the measured times is selected as the processing time.

Then, at the next step S55, the data select unit 51 accesses the priority-level assignment table storage unit 37 to identify a video-data track having the highest priority level and retrieves the video data for the track from the image-data storage unit 42.

Subsequently, at the next step S56, the data select unit 51 calculates the time it takes to carry out a process to reproduce this retrieved video data and sets the time in the variable Ts. The time it takes to carry out the reproduction process varies depending on the codec type of the data. For this reason, data is supplied to the reproduction apparatus, a process to reproduce the data is carried out and the processing time is measured for each codec type. Then, a statistical processing time, such as an average processing time, is determined from the measured processing times. It is to be noted that the codec type is the type of method for encoding and decoding data. In the case of video data, an example of the codec type is the MPEG2 method.

Then, at the next step S57, the data select unit 51 subtracts the variable Ts from the variable Tr and takes the result as a new value of the variable Tr.

Subsequently, at the next step S58, the data select unit 51 adds the track of the video data retrieved at step S55 to a reproduction list. The reproduction list is a table stored in the priority-level assignment table storage unit 37 as a table of track IDs.

Then, at the next step S59, the data select unit 51 accesses the priority-level assignment table storage unit 37 to identify an audio-data track having the highest priority level and retrieves the audio data for the track from the sound-data storage unit 48.

Subsequently, at the next step S60, the data select unit 51 calculates the time it takes to carry out a process to reproduce this retrieved audio data and sets the time in the variable Ts. Then, the data select unit 51 subtracts the variable Ts from the variable Tr and takes the result as a new value of the variable Tr. Subsequently, the data select unit 51 adds the track of the audio data retrieved at the step S59 to the reproduction list.

In this way, the smallest amount of the capacity to reproduce an image can be preserved. This is because the reproduction processing capacity has been allocated to the video data and the audio data, which take precedence over others.

Then, at the next step S61, the data select unit 51 determines whether the relation Tr>0 holds true, that is, whether reproduction processing capacity is still available in the reproduction apparatus.

If the result of the determination indicates that the relation Tr>0 holds true, that is, there is still reproduction processing capacity left in the reproduction apparatus, the flow of the operation goes on to step S62. At this step, the data select unit 51 accesses the priority-level assignment table storage unit 37 to select a data track having the highest priority level from among the tracks stored in the storage units as tracks, the properness of the reproduction process of which has not been determined.

Subsequently, at the next step S63, the data select unit 51 calculates the time it takes to carry out a process to reproduce data of the selected track and sets the time in the variable Ts.

Then, the data select unit 51 compares the variable Tr with the variable Ts. If the variable Tr is greater than the variable Ts, the flow of the operation goes on to step S65 at which the data select unit 51 adds the data track selected at step S62 to the reproduction list. This is because data of the selected track can be reproduced within the remaining reproduction processing capacity.

Then, at the next step S66, the data select unit 51 subtracts the variable Ts from the variable Tr and takes the result as a new value of the variable Tr. Subsequently, the flow of the operation goes back to step S61.

If the result determined at step S61 indicates that the relation Tr≦0 holds true, that is, reproduction processing capacity is no longer available in the reproduction apparatus, or if the result determined at step S64 indicates that the relation Tr≦Ts holds true, on the other hand, the flow of the operation goes on to step S67 at which the data select unit 51 acquires the current time from the timer and sets the current time in the variable T2.

Then, at the next step S68, the data select unit 51 subtracts the variable T1 from the variable T2 and sets the result in the compensation time Tc. In this way, the compensation time Tc is changed to the time actually required by the reproduction apparatus.

Subsequently, the data select unit 51 outputs data to be reproduced in accordance with the reproduction list to the image-decoding unit 15, the graphics-decoding unit 16, the text-decoding unit 32 or the sound-decoding unit 17 depending on the substance of the data. As a result, the reproduction apparatus reproduces the view data.

As described above, in the fifth embodiment, by considering the time it takes to actually carry out a process to reproduce a track, the data track having the highest priority level is sequentially selected from among the tracks stored in the storage units as tracks with no reproduction processing capacity allocated thereto yet. Thus, the reproduction processing capacity of the reproduction apparatus can be even better utilized than the fourth embodiment with no portion of the reproduction processing capacity left unused.

Next, another embodiment is explained.

SIXTH EMBODIMENT

In the case of the fifth embodiment, if reproduction processing capacity is still available in the reproduction apparatus, each track is examined in an order starting with the track having the highest priority level in order to determine whether the examined track can be reproduced within the available capacity for reproduction processing. If the track cannot be reproduced within the available capacity for reproduction processing, the operation to examine tracks is ended without determining whether any of the other tracks can be reproduced within the available capacity. In the case of a sixth embodiment, on the other hand, even if a track is determined to be not reproducible within the available capacity for reproduction processing, the operation to examine remaining tracks is continued by determining whether the next track can be reproduced within the available capacity. Thus, the sixth embodiment is capable of utilizing the reproduction processing capacity of the reproduction apparatus with a higher degree of efficiency than the fifth embodiment.

The reproduction apparatus according to the sixth embodiment is also provided with a priority-level assignment table storage unit 37 which has not only a non-volatile storage circuit for storing a priority-level assignment table, but also a writable storage circuit for storing different pieces of data required in processing and a timer connected to the data select unit 51 as a timer-displaying means, none of which is shown in the figures. An example of the writable storage circuit is a RAM (Random-Access Memory). In order to utilize the reproduction processing capacity more efficiently, however, the data select unit 51 is designed as a component for carrying out a process represented by the flowchart shown in FIG. 15. Since the reproduction apparatus has the same configuration as the one shown in FIG. 11, the configuration of the reproduction apparatus is not explained.

Figure 15:
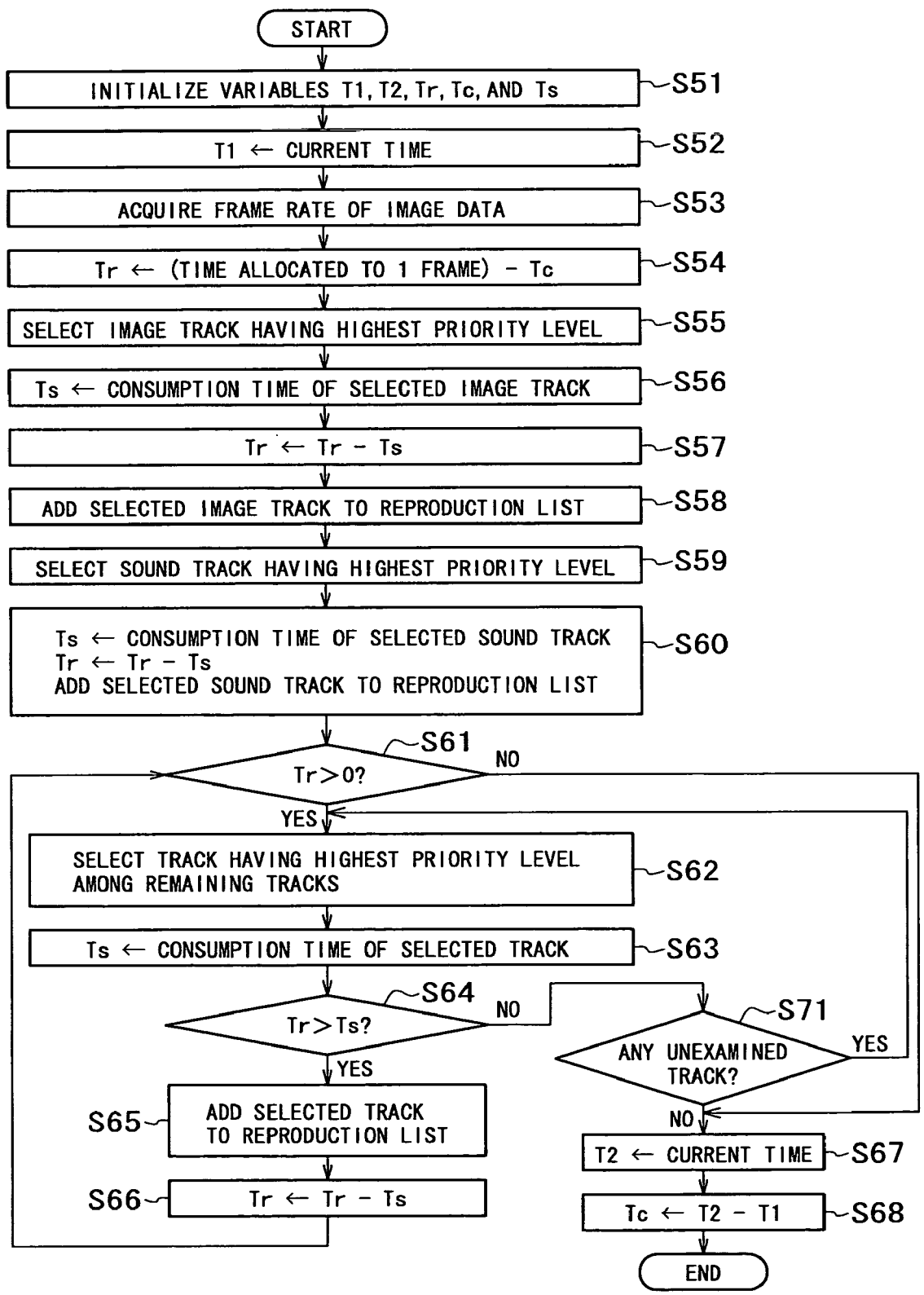
FIG. 15 shows a flowchart representing operations carried out by a data select unit employed in a sixth embodiment.

FIG. 15 shows a flowchart representing operations carried out by a data select unit employed in the sixth embodiment.

In the operations represented by the flowchart shown in FIG. 15, input data is supplied by way of the input-data interface 11. The operations carried out by the data select unit 51 at steps S51 to S60 to select a video-data track and an audio-data track having the highest priority level and to add the selected tracks to the reproduction list are the same as their counterparts in the flowchart shown in FIG. 14. It is thus unnecessary to repeat the explanation of those steps.

Then, at the next step S61, the data select unit 51 determines whether the relation Tr>0 holds true. If the result of the determination indicates that the relation Tr>0 holds true, that is, there is still reproduction processing capacity available in the reproduction apparatus, the flow of the operation goes on to step S62. At this step, the data select unit 51 accesses the priority-level assignment table storage unit 37 to select a data track having the highest priority level from among the tracks stored in the storage units as tracks, the properness of the reproduction process of which has not been determined yet.

Subsequently, at the next step S63, the data select unit 51 calculates the time it takes to carry out a process to reproduce data of the selected track and sets the time in the variable Ts.

Then, the data select unit 51 compares the variable Tr with the variable Ts. If the variable Tr is greater than the variable Ts, the flow of the operation goes on to step S65 at which the data select unit 51 adds the data track selected at step S62 to the reproduction list. This is because data of the selected track can be reproduced within the remaining reproduction processing capacity.

Then, at the next step S66, the data select unit 51 subtracts the variable Ts from the variable Tr and takes the result as a new value of the variable Tr. Subsequently, the flow of the operation goes back to step S61.

If the result determined at step S61 indicates that the relation Tr≦0 holds true, that is, reproduction processing capacity is no longer available in the reproduction apparatus, on the other hand, the flow of the operation goes on to step S67 at which the data select unit 51 acquires the current time from the timer and sets the current time in the variable T2.

Then, at the next step S68, the data select unit 51 subtracts the variable T1 from the variable T2 and sets the result in the compensation time Tc. In this way, the compensation time Tc is changed to the time actually required by the reproduction apparatus.

In addition, if the result determined at step S64 indicates that the relation Tr≦Ts holds true, the data select unit 51 accesses the priority-level assignment table storage unit 37 to determine whether tracks still exist in the storage units as tracks, the properness of the reproduction process of which has not been determined yet. The data select unit 51 determines the existence of such tracks in order to determine whether a data track reproducible within the remaining reproduction processing capacity exists among the tracks other than the selected data track. This is because a reproduction processing capacity that is large enough to carry out a process to reproduce the selected data track is no longer available.

If the result of the determination confirms the existence of such a track, the properness of the reproduction process of which has not been determined yet, the flow of the operation goes back to step S61. On the other hand, if the result of the determination confirms the non-existence of such a track, the properness of the reproduction process of which has not been determined yet, the operations of steps S67 and S68 are carried out.

As described above, in the sixth embodiment, the storage units are searched for all tracks reproducible within the remaining reproduction processing capacity by taking priority levels into consideration as long as reproduction processing capacity remains. Thus, the reproduction processing capacity of the reproduction apparatus can be even better utilized than the fifth embodiment with no portion of the reproduction processing capacity left unused.

Next, another embodiment is explained.

SEVENTH EMBODIMENT

As preconditions of the fifth and sixth embodiments, the reproduction processing and the unit time are uniform for all tracks. In the case of a seventh embodiment, however, these preconditions are not required. Thus, the seventh embodiment is a more general embodiment.

Figure 16:
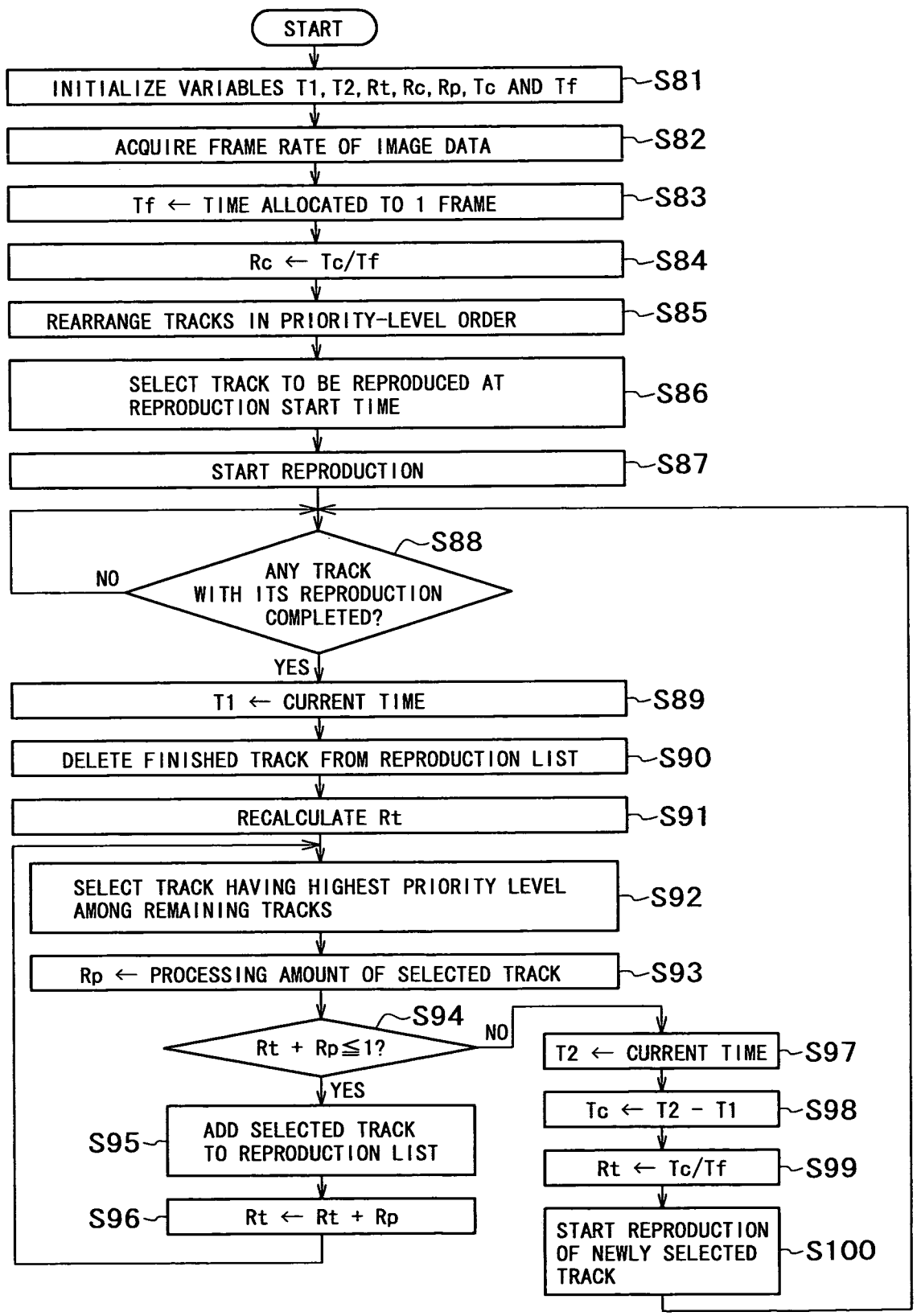
FIG. 16 shows a flowchart representing operations carried out by a data select unit employed in a seventh embodiment.

FIG. 16 shows a flowchart representing operations carried out by a data select unit employed in the seventh embodiment.

First of all, input data is supplied to the input-data analysis unit 41 by way of the input-data interface 11.

The input-data analysis unit 41 determines the type of input actual data by referring to an identifier prescribed in a track property atom and supplies the input data along with the result of the determination to the image-data storage unit 42, the graphics-data storage unit 44, the text-data storage unit 46 or the sound-data storage unit 48 depending on the result of the determination.

The flowchart shown in FIG. 16 begins with step S81 at which the data select unit 51 initializes variables such as T1, T2, Rt, Rc, Rp, Tc and Tf.

Then, at the next step S82, the data select unit 51 acquires a frame rate of video data (image data) as a result of the calculation from a time-to-sample atom and a media handler atom.

Subsequently, at the next step S83, the data select unit 51 calculates a processing time allocated to a process to reproduce one frame and sets the result of the calculation in the variable Tf. The variable Tf represents the time it takes to reproduce one frame.

Then, at the next step S84, the data select unit 51 divides a compensation time Tc by the variable Tf and sets the result of the division in the variable Rc. The compensation time Tc is the time it takes to carry out processing such as a process to select a track.

Subsequently, at the next step S85, the data select unit 51 rearranges tracks in an order of priority levels, typically in accordance with a priority-level assignment table.

Then, at the next step S86, the data select unit 51 selects a track to be reproduced at the start of reproduction processing as a track reproducible within the reproduction processing capacity.

The following description explains a process to select a track to be reproduced at the start of reproduction processing.

Figure 17:
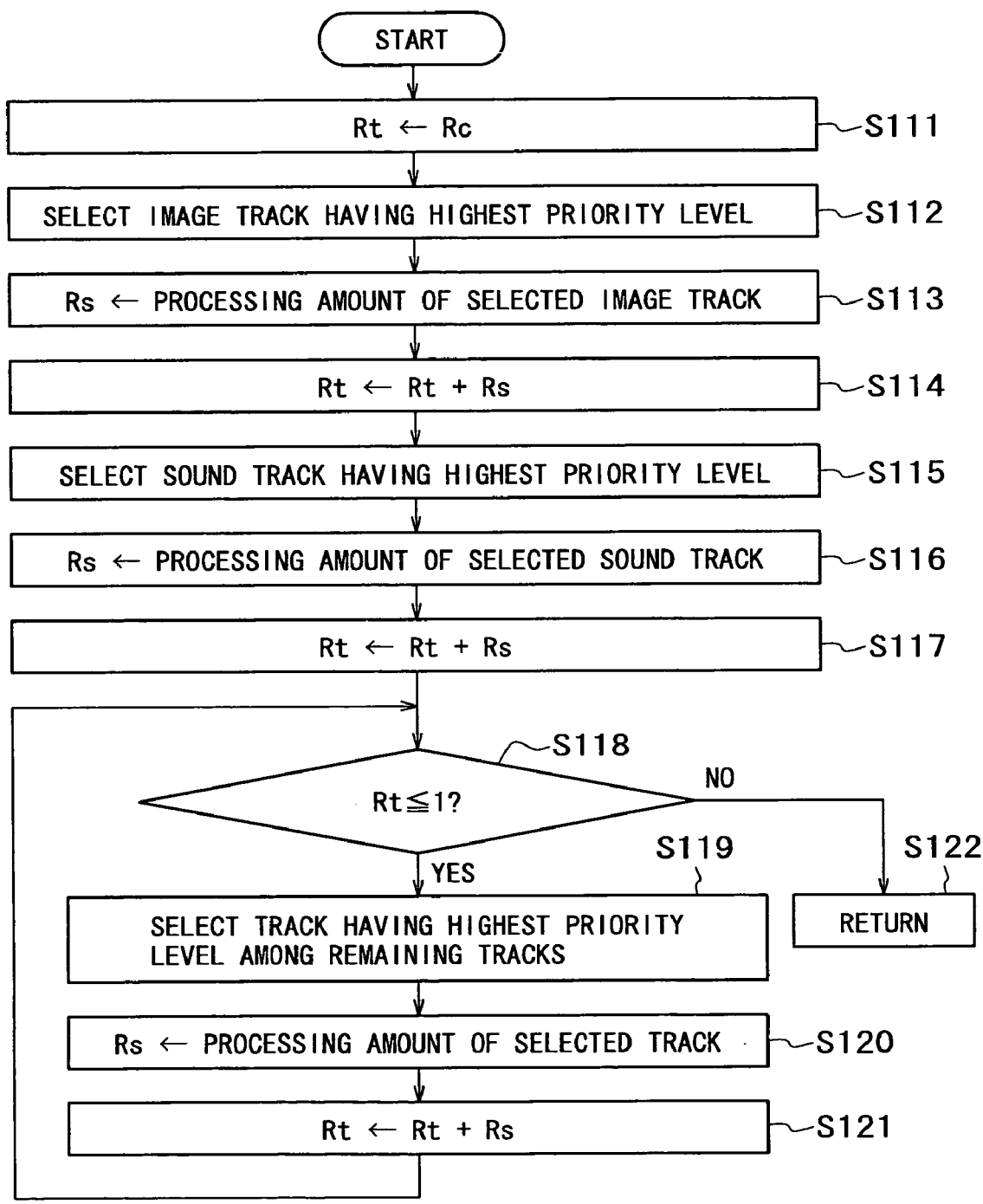
FIG. 17 shows a flowchart representing a process to select a track to be reproduced at the start time of a reproduction process.

FIG. 17 shows a flowchart representing the process to select a track to be reproduced at the start of reproduction processing. The flowchart begins with step S111 at which the data select unit 51 substitutes the variable Rc to the variable Rt representing a total processing amount of the reproduction processing.

Then, at the next step S112, the data select unit 51 accesses the priority-level assignment table storage unit 37 to identify a video-data track having the highest priority level and retrieves the video data for the track from the image-data storage unit 42.

Subsequently, at the next step S113, the data select unit 51 calculates an amount of reproduction processing required to reproduce the video data retrieved from the image-data storage unit 42 and sets the result of the calculation in the variable Rs. In the case of QT, the amount of reproduction processing required to reproduce video data is typically a quotient obtained as a result of dividing the processing time of 1 sample (one frame) by the duration time of the sample.

It is to be noted that, by the same token, the amount of reproduction processing required to reproduce audio data is a quotient obtained as a result of dividing the processing time of 1 sample by the duration time of the sample. Likewise, the amount of reproduction processing required to reproduce graphics data is a quotient obtained as a result of dividing the processing time of 1 sample (one frame) by 1 video frame time, which is equal to the duration time of 1 sample of video data. Similarly, the amount of a special effect is a quotient obtained as a result of dividing the processing time of a process to reproduce 1 video frame by the time of the video frame.

Then, at the next step S114, the data select unit 51 adds the value of the variable Rs to the variable Rt and takes the sum as a new value of the variable Rt.

Subsequently, at the next step S115, the data select unit 51 accesses the priority-level assignment table storage unit 37 to identify an audio-data track having the highest priority level and retrieves the audio data for the track from the image-data storage unit 42.

Subsequently, at the next step S116, the data select unit 51 calculates an amount of reproduction processing required to reproduce the audio data retrieved from the image-data storage unit 42 and sets the result of the calculation in the variable Rs.

Then, at the next step S117, the data select unit 51 adds the value of the variable Rs to the variable Rt and takes the sum as a new value of the variable Rt.

Subsequently, at the next step S118, the data select unit 51 examines the value of the variable Rt to determine whether the variable Rt is less than or equal to 1.0, that is, whether reproduction processing capacity is still available in the reproduction apparatus.

If the result of the determination indicates that the relation Rt≦1.0 holds true, that is, the variable Rt is not greater than 1.0 implying that reproduction processing capacity is still available in the reproduction apparatus, the flow of the process goes on to step S119 at which the data select unit 51 accesses the priority-level assignment table storage unit 37 to determine whether tracks still exist in the storage units as tracks, the properness of the reproduction process of which has not been determined yet.

Subsequently, at the next step S120, the data select unit 51 calculates an amount of reproduction processing required to reproduce the selected frame and sets the result of the calculation in the variable Rs.

Then, at the next step S121, the data select unit 51 adds the value of the variable Rs to the variable Rt and takes the sum as a new value of the variable Rt. Subsequently, the flow of the process goes back to step S118.

If the result determined at step S118 indicates that the relation Rt>1.0 holds true, that is, the variable Rt is greater than 1.0 implying that no reproduction processing capacity is available in the reproduction apparatus, on the other hand, the flow of the process goes on to step S122 at which processing control is returned to step S87 of the main routine represented by the flowchart shown in FIG. 16.

Refer back to FIG. 16. At step S87, the data select unit 51 supplies each piece of data selected as data to be reproduced at the start of reproduction processing to the image-decoding unit 15, the graphics-decoding unit 16, the text-decoding unit 32 or the sound-decoding unit 17 depending on the substance of the data, and the reproduction apparatus starts the video reproduction processing.

Then, at the next step S88, the data select unit 51 determines whether a track exists, the reproduction processing of which has been ended. If the result of the determination indicates that such a track does not exist, the flow of the operation goes back to step S88 at which the data select unit 51 repeats the determination at this step. If the result of the determination indicates that such a track exists, on the other hand, the flow of the operation goes on to step S89 at which the data select unit 51 obtains the current time from the timer and sets the current time in the variable T1.

Subsequently, at the next step S90, the data select unit 51 deletes the track, the reproduction processing of which has been ended, from the reproduction list.

Then, at the next step S91, the data select unit 51 recalculates the variable Rt. The calculation of the variable Rt is explained as follows.

Figure 18:
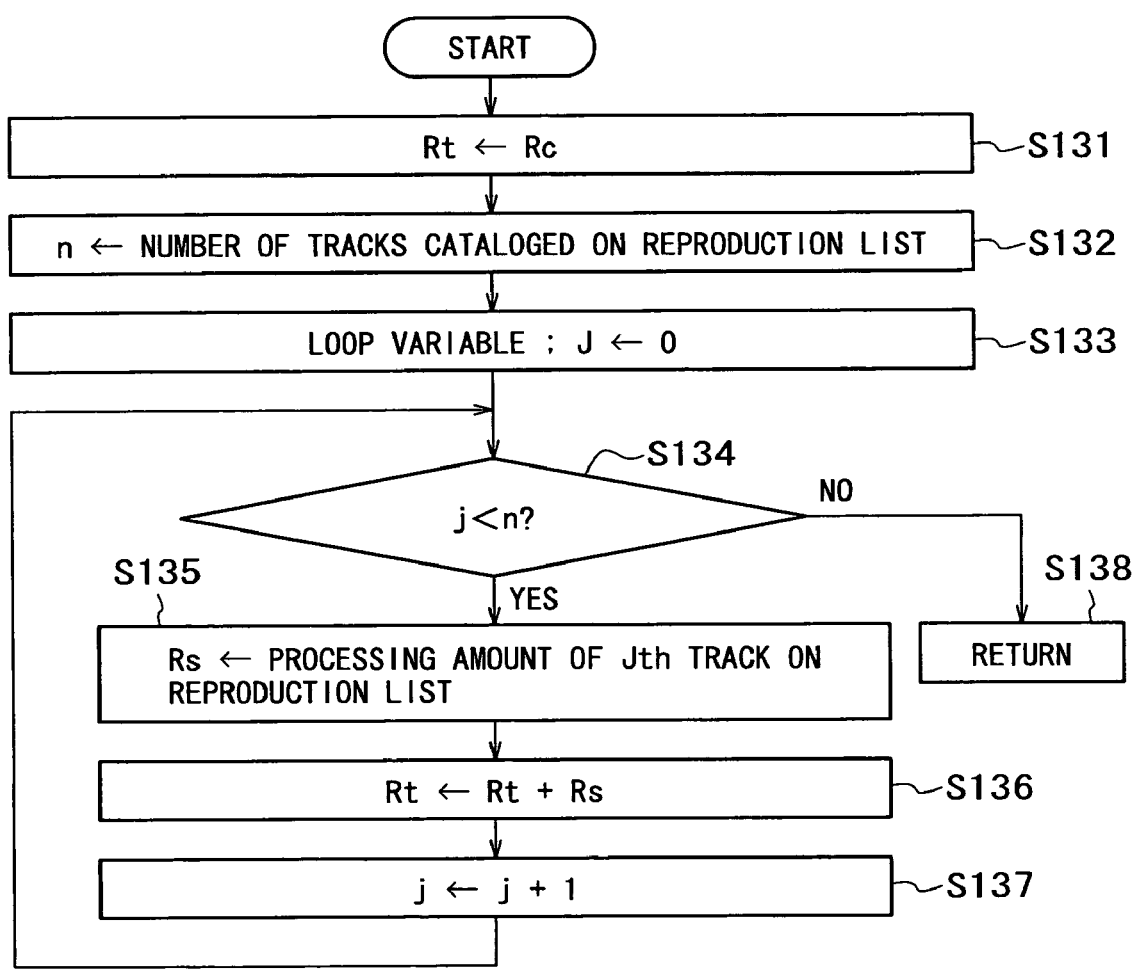
FIG. 18 shows a flowchart representing a process to calculate a variable Rt.

FIG. 18 shows a flowchart representing a process to calculate the variable Rt. The flowchart begins with step S131 at which the data select unit 51 substitutes the value of the variable Rc to the variable Rt.

Then, at the next step S132, the data select unit 51 accesses the priority-level assignment table storage unit 37 to find the number of tracks cataloged on the reproduction list and sets the number of tracks in a variable n.

Subsequently, at the next step S133, the data select unit 51 initializes a loop variable j by setting the variable j at 0.

Then, the data select unit 51 compares the variable j with the variable n and, if the variable j is found to be smaller than the variable n, the flow of the process goes on to step S135 at which the data select unit 51 calculates the amount of processing for the jth track cataloged on the reproduction list and sets the amount of processing in the variable Rs.

Subsequently, at the next step S136, the data select unit 51 adds the value of the variable Rs to the variable Rt and takes the sum as a new value of the variable Rt.

Then, at the next step S137, the data select unit 51 increments the loop variable j by 1 and takes the result of the increment as a new value of the loop variable j. Subsequently, the flow of the process goes back to step S134. In this way, the total amount of processing for the jth track cataloged on the reproduction list is recalculated.

If the comparison result obtained at step S134 indicates that the variable j is at least equal to the variable n, on the other hand, the flow of the process goes on to step S138 at which the control of processing is returned to step S91 of the main routine of the flowchart shown in FIG. 16. This is because the amount of processing has been calculated for each track remaining on the reproduction list after the deletion of the track, the reproduction processing of which has been ended, that is, because the total amount of processing has been recalculated.

Since extra processing capacity of the reproduction apparatus is generated by the amount of processing for the track, the reproduction processing of which has been ended, operations are carried out at steps S92 to S100 to search for tracks which can be processed and reproduced within the capacity, as tracks to be reproduced.

More specifically, at step S92 shown in FIG. 16, the data select unit 51 accesses the priority-level assignment table storage unit 37 to select a data track having the highest priority level from among the tracks stored in the storage units but not yet cataloged on the reproduction list.

Then, at the next step S93, the data select unit 51 calculates the amount of processing required to reproduce the data for the selected track and sets the result of the calculation in the variable Rp.

Subsequently, at the next step S94, the data select unit 51 compares the sum obtained as a result of adding the value of the variable Rp to the variable Rt with 1.0 to determine whether the sum is less than or equal to 1.0.

If the result of the determination indicates that the sum of the variables Rt and Rp is not greater than 1.0, that is, the relation $(Rt+Rp) \leq 1.0$ holds true, indicating that the data of the selected track can be reproduced, the flow of the operation goes on to step S95 at which the selected track is added to the reproduction list. Then, at the next step S96, the data select unit 51 adds the value of the variable Rp to the variable Rt and takes the sum as a new value of the variable Rt. Subsequently, the flow of the operation goes back to step S92.

If the result determined at step S94 indicates that the sum of the variables Rt and Rp is greater than 1.0, that is, the relation $(Rt+Rp)>1.0$ holds true, indicating that the data of the selected track cannot be reproduced using the remaining reproduction processing capacity, on the other hand, the flow of the operation goes on to step S97 to give up the process to reproduce the data of the selected track, and the data select unit 51 obtains the current time from the timer, setting the current time in the variable T2.

Then, at the next step S98, the data select unit 51 subtracts the variable T1 from the variable T2 and sets the result in the compensation time Tc. In this way, the compensation time Tc is changed to a period of time actually required by the reproduction apparatus.

Subsequently, at the next step S99, the data select unit 51 divides the compensation time Tc by the variable Tf and sets the result in the variable Rt.

Then, at the next step S100, the data select unit 51 accesses the priority-level assignment table storage unit 37 to find the priority level of each of tracks cataloged on the reproduction list as tracks to be reproduced, and supplies the data of the tracks to the image-decoding unit 15, the graphics-decoding unit 16, the text-decoding unit 32 or the sound-decoding unit 17 in accordance with the substance of the data so as to allow the reproduction apparatus to start a reproduction process. Then, the data select unit 51 returns control of processing to step S88.

As described above, in the seventh embodiment, by considering the actual amount of processing for each track, a data track having the highest priority level is sequentially selected from among the tracks stored in the storage units as tracks with no reproduction processing capacity allocated thereto yet every time available capacity exists for reproduction processing, even if the unit time of the reproduction processing is not uniform for all of the tracks. As a result, the seventh embodiment is capable of better utilizing the reproduction processing capacity of the reproduction apparatus than the fourth embodiment, with no portion of the reproduction processing capacity left unused.

In a reproduction apparatus provided by the present invention, priority-level determination means finds the priority level of input data from a priority-level assignment table and the input data is supplied to predetermined decoding means only if the priority level of the input data is found to be higher than a threshold value. Thus, by setting a predetermined threshold value in accordance with the reproduction processing capacity of the reproduction apparatus, the data can be reproduced within the reproduction processing capacity. As a result, an image can be obtained in a smooth operation without losing a frame. In addition, input data can be supplied to the decoding means on the basis of a reproduction table created as a list of pieces of data to be reproduced in the order of priority levels assigned to the pieces of data by utilizing the reproduction processing capacity. The priority levels are obtained from the priority-level assignment table showing the priority level of each input data, whereas the reproduction processing capacity is defined as the amount of processing by which data can be reproduced within a predetermined period of time. Thus, since the reproduction apparatus is capable of reproducing data within the reproduction processing capacity, an image can be obtained in a smooth operation without losing any frames. As a result, data can be reproduced in accordance with a priority level within the reproduction processing capacity so that it is possible to exhibit a special effect deemed to be important by editors and other users.

The invention claimed is:

1. A reproduction apparatus for reproducing view data including image data and one or more pieces of edit data for editing the image data, said reproduction apparatus comprising:

input means for inputting the view data, the view data including an identifier for indicating a substance of the view data;

analysis means for identifying the substance of the view data input by said input means by referring to the identifier included in the view data;

storage means for storing a priority-level assignment table and a predetermined threshold value, the priority-level assignment table having a plurality of priority levels and a plurality of track types arranged such that each priority level is associated with a corresponding track type, the priority levels indicating a sequence in which data is to be decoded, and the predetermined threshold value serving as a border between the priority levels assigned to one portion of the data which is to be reproduced and the priority levels assigned to another portion of the data which is not to be reproduced;

a plurality of decode means for decoding coded data, each decode means decoding a different type of the coded data; and determination means for determining whether a portion of the view data is to be decoded based on the substance of the portion of the view data as identified by said analysis means, the priority level assigned to the portion of the view data and the threshold value, and for outputting the portion of the view data to one of said decode means selected in accordance with the type of the portion of the view data if the portion of the view data is to be decoded.

2. A reproduction apparatus for reproducing data from a recording medium having a plurality of tracks each used to record image data and one or more pieces of edit data for editing the image data, said reproduction apparatus comprising:

input means for inputting the data from the recording medium, the data including an identifier for indicating a type of each of the tracks from the recording medium;

analysis means for identifying the type of the track in which the data input by said input means is recorded by referencing the identifier included in the data;

storage means for storing a priority-level assignment table and a predetermined threshold value, the priority-level assignment table having a plurality of priority levels and a plurality of track types arranged such that each priority level is associated with a corresponding track type, the priority levels indicating a sequence in which data is to be decoded, and the predetermined threshold value serving as a border between the priority levels assigned to one portion of the data which is to be reproduced and the priority levels assigned to another portion of the data which is not to be reproduced;

a plurality of decode means for decoding coded data, each decode means decoding a different type of the coded data; and determination means for determining whether a portion of the input data is to be decoded based on the track type in which the portion of the input data is recorded as identified by said analysis means, the priority level assigned to the portion of the input data and the threshold value, and for outputting the portion of the input data to one of said decode means selected in accordance with the type of the portion of the input data if the portion of the input data is to be decoded.

3. A reproduction apparatus according to claim 1, wherein the priority-level assignment table is created for the substance of the view data to be processed within a predetermined time.

4. A reproduction apparatus according to claim 2, wherein the priority-level assignment table is created for the track types to be processed within a predetermined time.

5. A reproduction apparatus for reproducing view data including image data and one or more pieces of edit data for editing the image data, said reproduction apparatus comprising:

input means for inputting the view data, the view data including an identifier for indicating a substance of the view data;

analysis means for identifying the substance of the view data input by said input means by referring to the identifier included in the view data;

storage means for storing a priority-level assignment table and a predetermined threshold value, the priority-level assignment table having priority levels assigned to data based on the substance of the data, the priority levels indicating a sequence in which the data is to be decoded, and the predetermined threshold value serving as a border between the priority levels assigned to one portion of the data which is to be reproduced and the priority levels assigned to another portion of the data which is not to be reproduced;

a plurality of decode means for decoding coded data, each decode means decoding a different type of the coded data; and determination means for determining whether a portion of the view data is to be decoded based on the substance of the portion of the view data as identified by said analysis means, the priority level assigned to the portion of the view data and the threshold value, and for outputting the portion of the view data to one of said decode means selected in accordance with the type of the portion of the view data if the portion of the view data is to be decoded, wherein the priority-level assignment table is created for the type of the data and the predetermined threshold value is provided for the type of the data.

6. A reproduction apparatus for reproducing data from a recording medium having a plurality of tracks each used to record image data and one or more pieces of edit data for editing the image data, said reproduction apparatus comprising:

input means for inputting the data from the recording medium, the data including an identifier for indicating a type of each of the tracks from the recording medium;

analysis means for identifying the type of the track in which the data input by said input means is recorded by referencing the identifier included in the data;

storage means for storing a priority-level assignment table and a predetermined threshold value, the priority-level assignment table having priority levels assigned to data based on the track type in which the data is recorded, the priority levels indicating a sequence in which the data is to be decoded, and the predetermined threshold value serving as a border between the priority levels assigned to one portion of the data which is to be reproduced and the priority levels assigned to another portion of the data which is not to be reproduced;

a plurality of decode means for decoding coded data, each decode means decoding a different type of the coded data; and determination means for determining whether a portion of the input data is to be decoded based on the track type in which the portion of the input data is recorded as identified by said analysis means, the priority level assigned to the portion of the input data and the threshold value, and for outputting the portion of the input data to one of said decode means selected in accordance with the type of the portion of the input data if the portion of the input data is to be decoded, wherein the priority-level assignment table is created for the type of the data and the predetermined threshold value is provided for the type of the data.

7. A reproduction apparatus for reproducing data, said reproduction apparatus comprising:

input means for receiving input data, the input data including an identifier for indicating a track type associated therewith;

analysis means for identifying the track type of the input data received by said input means by referencing the identifier included in the input data;

storage means for storing a priority-level assignment table and a predetermined threshold value, the priority-level assignment table having a number of priority levels and a number of track types arranged such that each priority level is associated with a corresponding track type, the number of priority levels indicative of a decoding sequence; and means for acquiring the respective priority level for at least a portion of the input data from the priority-level assignment table of the storage means by use of the track type identified by the analysis means, for determining whether the at least portion of the input data is to be decoded based on the respective priority level and the threshold value, and for outputting the at least portion of the input data for receipt by a respective decoder if the at least portion of the input data is to be decoded.

* * * * *